US 12,448,508 B2

(12) United States Patent
Bae et al.

(10) Patent No.: US 12,448,508 B2
(45) Date of Patent: Oct. 21, 2025

(54) CROSSLINKING OF AROMATIC POLYMERS FOR ANION EXCHANGE MEMBRANES

(71) Applicant: Rensselaer Polytechnic Institute, Troy, NY (US)

(72) Inventors: Chulsung Bae, Cohoes, NY (US); Jong Yeob Jeon, Troy, NY (US); Junyoung Han, Troy, NY (US); Sangtaik Noh, Troy, NY (US)

(73) Assignee: Rensselaer Polytechnic Institute, Troy, NY (US)

( * ) Notice: Subject to any disclaimer, the term of this patent is extended or adjusted under 35 U.S.C. 154(b) by 1250 days.

(21) Appl. No.: 17/050,256

(22) PCT Filed: Apr. 24, 2019

(86) PCT No.: PCT/US2019/028925
§ 371 (c)(1),
(2) Date: Oct. 23, 2020

(87) PCT Pub. No.: WO2019/209959
PCT Pub. Date: Oct. 31, 2019

(65) Prior Publication Data
US 2021/0108067 A1    Apr. 15, 2021

Related U.S. Application Data

(60) Provisional application No. 62/661,705, filed on Apr. 24, 2018.

(51) Int. Cl.
*C08L 53/02*     (2006.01)
*B01D 67/00*    (2006.01)
(Continued)

(52) U.S. Cl.
CPC .......... *C08L 53/02* (2013.01); *B01D 67/0006* (2013.01); *B01D 67/00931* (2022.08);
(Continued)

(58) Field of Classification Search
CPC . B01J 41/14; B01J 41/13; B01D 2323/21834; B01D 2323/30; B01D 2325/16
(Continued)

(56) References Cited

U.S. PATENT DOCUMENTS 1,123,196  A    12/1914  Kilmer
6,590,067  B2    7/2003  Kerres et al.
(Continued)

FOREIGN PATENT DOCUMENTS

CA    2396166  A1    1/2003
CN    1312833  A    9/2001
(Continued)

OTHER PUBLICATIONS

Hao, et al, "Crosslinked high-performance anion exchange membranes based on poly(styrene-b-(ethylene-co-butylene)-b-styrene)," Journal of Membrane Science 551 (2018), 66-75. (Year: 2018).*
(Continued)

*Primary Examiner* — Fred M Teskin
(74) *Attorney, Agent, or Firm* — Weaver Austin Villeneuve & Sampson LLP

(57) ABSTRACT

An ion exchange membrane material is composed of a crosslinked polymer network including a first poly(styrene-b-ethylene-r-butylene-b-styrene) triblock copolymer (SEBS), and second SEBS, and a linker crosslinking the first SEBS and the second SEBS. At least one phenyl group from the first SEBS and the second SEBS is functionalized with an alkyl group, and the carbon at the benzylic position of these alkyl groups is saturated with at least two additional alkyl groups. The linker is a diamine bound to the alkyl functional groups. The ion exchange membrane material is made via a substantially simultaneous quaternization and crosslinking reaction between the diamine linker and SEBS functionalized with alkyl halide groups. Increasing concen-
(Continued)

tration of crosslinker in produces membranes with reduced water uptake, leading to an expectation of enhanced stability under hydrated conditions and greater durability. Advantageously, this reduction in water uptake came with little change to ion exchange capacity.

12 Claims, 9 Drawing Sheets

(51) Int. Cl.
- B01D 69/02 (2006.01)
- B01D 71/26 (2006.01)
- B01D 71/28 (2006.01)
- B01D 71/80 (2006.01)
- B01D 71/82 (2006.01)
- B01J 41/14 (2006.01)
- C08J 5/22 (2006.01)

(52) U.S. Cl.
CPC ........... *B01D 69/02* (2013.01); *B01D 71/281* (2022.08); *B01D 71/80* (2013.01); *B01D 71/82* (2013.01); *B01J 41/14* (2013.01); *C08J 5/2237* (2013.01); *B01D 2323/30* (2013.01); *B01D 2323/36* (2013.01); *B01D 2325/16* (2013.01); *B01D 2325/42* (2013.01); *C08J 2353/02* (2013.01); *C08J 2453/02* (2013.01)

(58) Field of Classification Search
USPC .............................................. 521/27, 30, 32
See application file for complete search history.

(56) References Cited

U.S. PATENT DOCUMENTS

| | | |
|---|---|---|
| 7,078,121 B2 | 7/2006 | Kanaoka et al. |
| 7,615,300 B2 | 11/2009 | Bae |
| 7,671,157 B2 | 3/2010 | Bae |
| 7,888,397 B1 | 2/2011 | Hibbs et al. |
| 8,445,141 B2 | 5/2013 | Kitamura et al. |
| 8,697,203 B2 | 4/2014 | Koenig |
| 8,809,483 B1 | 8/2014 | Hibbs |
| 9,051,431 B2 | 6/2015 | Kim et al. |
| 9,276,282 B2 | 3/2016 | Zhang et al. |
| 9,534,097 B2 | 1/2017 | Hibbs |
| 9,580,541 B1 | 2/2017 | Fujimoto et al. |
| 9,988,526 B2 | 6/2018 | Rodrigues et al. |
| 10,053,534 B2 | 8/2018 | Fujimoto |
| 10,053,535 B2 | 8/2018 | Kim et al. |
| 10,170,799 B2 | 1/2019 | Ouchi et al. |
| 10,272,424 B2 | 4/2019 | Bae et al. |
| 10,290,890 B2 | 5/2019 | Yan et al. |
| 10,294,325 B2 | 5/2019 | Fujimoto |
| 10,370,483 B2 | 8/2019 | Kim et al. |
| 10,435,504 B2 | 10/2019 | Bae et al. |
| 11,236,196 B2 | 2/2022 | Bae et al. |
| 11,286,337 B2 | 3/2022 | Bae et al. |
| 11,621,433 B2 | 4/2023 | Bae et al. |
| 11,826,746 B2 | 11/2023 | Bae et al. |
| 11,834,550 B2 | 12/2023 | Bae et al. |
| 11,987,664 B2 | 5/2024 | Bae et al. |
| 12,027,731 B2 | 7/2024 | Bae et al. |
| 2002/0061431 A1 | 5/2002 | Koyama et al. |
| 2002/0062046 A1 | 5/2002 | Swan et al. |
| 2003/0056669 A1 | 3/2003 | Miller et al. |
| 2003/0114598 A1 | 6/2003 | Li et al. |
| 2003/0134936 A1 | 7/2003 | West et al. |
| 2003/0173547 A1 | 9/2003 | Yamakawa et al. |
| 2004/0048127 A1 | 3/2004 | Shirai et al. |
| 2006/0004177 A1 | 1/2006 | Gao et al. |
| 2006/0135702 A1 | 6/2006 | Wang et al. |
| 2007/0048579 A1 | 3/2007 | Bae |
| 2008/0262163 A1 | 10/2008 | Bae |
| 2009/0004528 A1 | 1/2009 | Fritsch et al. |
| 2009/0280383 A1 | 11/2009 | MacKinnon et al. |
| 2010/0041834 A1 | 2/2010 | Bae |
| 2010/0047657 A1 | 2/2010 | MacKinnon et al. |
| 2010/0279204 A1 | 11/2010 | Isomura et al. |
| 2011/0207028 A1 | 8/2011 | Fukuta et al. |
| 2013/0292252 A1 | 11/2013 | Linder et al. |
| 2014/0024728 A1 | 1/2014 | Kim et al. |
| 2014/0227627 A1 | 8/2014 | He et al. |
| 2014/0275300 A1 | 9/2014 | Kim et al. |
| 2014/0353241 A1 | 12/2014 | Yin et al. |
| 2015/0017566 A1 | 1/2015 | Watanabe et al. |
| 2015/0111128 A1 | 4/2015 | Matsuda et al. |
| 2017/0114196 A1 | 4/2017 | Häring et al. |
| 2017/0203289 A1 | 7/2017 | Bae et al. |
| 2017/0252707 A1 | 9/2017 | Bahar et al. |
| 2017/0355811 A1 | 12/2017 | Bae et al. |
| 2018/0251616 A1 | 9/2018 | Bahar et al. |
| 2019/0308185 A1 | 10/2019 | Bae et al. |
| 2020/0055980 A1 | 2/2020 | Bae et al. |
| 2020/0091535 A1 | 3/2020 | Bae et al. |
| 2020/0094241 A1 | 3/2020 | Bae et al. |
| 2020/0172659 A1 | 6/2020 | Bae et al. |
| 2020/0223997 A1 | 7/2020 | Bae et al. |
| 2020/0238272 A1 | 7/2020 | Bae et al. |
| 2022/0052357 A1 | 2/2022 | Bae et al. |
| 2022/0127412 A1 | 4/2022 | Bae et al. |
| 2022/0227921 A1 | 7/2022 | Bae et al. |
| 2022/0266239 A1 | 8/2022 | Bae et al. |
| 2023/0096778 A1 | 3/2023 | Bae et al. |
| 2024/0141097 A1 | 5/2024 | Bae et al. |
| 2024/0157353 A1 | 5/2024 | Bae et al. |

FOREIGN PATENT DOCUMENTS

| | | | |
|---|---|---|---|
| CN | 101578729 A | 11/2009 | |
| CN | 102869448 A | 1/2013 | |
| CN | 103459526 A | 12/2013 | |
| CN | 103694490 A | 4/2014 | |
| CN | 106040318 A | 10/2016 | |
| CN | 106536583 A | 3/2017 | |
| CN | 107112563 A | 8/2017 | |
| CN | 109070022 A | 12/2018 | |
| EP | 0352798 A2 * | 1/1990 | ............... C08J 5/22 |
| EP | 2324529 B1 | 1/2016 | |
| JP | H06188005 A | 7/1994 | |
| JP | 2001002738 A | 1/2001 | |
| JP | 2003203648 A | 7/2003 | |
| JP | 2004131662 A | 4/2004 | |
| JP | 2012049111 A | 3/2012 | |
| JP | 2013505825 A | 2/2013 | |
| JP | 2016032098 A | 3/2016 | |
| JP | 2017531700 A | 10/2017 | |
| JP | 2018502180 A | 1/2018 | |
| JP | 2021523978 A | 9/2021 | |
| KR | 20140064308 A | 5/2014 | |
| KR | 20150060159 A | 6/2015 | |
| WO | WO-2006066505 A1 | 6/2006 | |
| WO | WO-2007079004 A2 | 7/2007 | |
| WO | WO-2012081026 A2 | 6/2012 | |
| WO | WO-2016014636 A1 | 1/2016 | |
| WO | WO-2016081432 A1 | 5/2016 | |
| WO | WO-2017172824 A1 | 10/2017 | |
| WO | WO-2018119020 A1 | 6/2018 | |
| WO | WO-2019010290 A1 | 1/2019 | |
| WO | WO-2019068051 A2 | 4/2019 | |

OTHER PUBLICATIONS

BR Office Action dated Aug. 17, 2023, in Application No. BR112021010146-2 with English Translation.
BR Office Action dated Dec. 9, 2022 in Application No. BR1120200219266 with English translation.
CA Office Action dated Jan. 26, 2022, in Application No. CA2968110.
CN Office Action dated Dec. 1, 2023 in CN Application No. 202180016258.9 with English Translation.
CN Office Action dated Jul. 7, 2023, in application No. CN201980077678 with English translation.

(56) References Cited

OTHER PUBLICATIONS

CN Office Action dated Jun. 25, 2023, in Application No. CN201980041740.0 with English translation.
CN Office Action dated Mar. 29, 2023, in Application No. CN202010532979.2 with English translation.
CN Office Action dated Oct. 31, 2023 in CN Application No. 201980041740.0, with English Translation.
IL office action dated Feb. 21, 2023, in application No. IL294876, with English Translation.
IN Office Action dated Dec. 26, 2022 in Application No. IN202117027525.
IN Office Action dated Feb. 1, 2024 in IN Application No. 202117027525.
IN Office Action dated Mar. 2, 2024 in IN Application No. 202117027525.
JP Office Action dated Mar. 7, 2023 in Application No. JP2020-559544 with English translation.
JP Office Action dated Oct. 31, 2023, in application No. JP2021-529055, with English Translation.
U.S. Final office Action dated Jan. 11, 2023 in U.S. Appl. No. 17/309,401.
U.S. Corrected Notice of Allowance dated Aug. 4, 2023, in U.S. Appl. No. 17/658,627.
U.S. Corrected Notice of Allowance dated Dec. 8, 2022 in U.S. Appl. No. 16/471,358.
U.S. Corrected Notice of Allowance dated Jan. 26, 2024 in U.S. Appl. No. 17/569,564.
U.S. Corrected Notice of Allowance dated Nov. 27, 2023 in U.S. Appl. No. 17/569,564.
U.S. Final Office Action dated Sep. 7, 2023, in U.S. Appl. No. 17/309,401.
U.S. Non-Final office Action dated Jan. 10, 2023 in U.S. Appl. No. 17/652,175.
U.S. Non-Final Office Action dated Oct. 31, 2022 in U.S. Appl. No. 17/569,564.
U.S. Notice of Allowance dated Feb. 14, 2024 in U.S. Appl. No. 17/569,564.
U.S. Notice of Allowance dated Feb. 28, 2024 in U.S. Appl. No. 17/309,401.
U.S. Notice of Allowance dated Jan. 5, 2024 in U.S. Appl. No. 17/569,564.
U.S. Notice of Allowance dated Jul. 17, 2023 in U.S. Appl. No. 17/658,627.
U.S. Notice of Allowance dated May 30, 2023 in U.S. Appl. No. 17/569,564.
U.S. Notice of Allowance dated Sep. 7, 2023 in U.S. Appl. No. 17/569,564.
U.S. Appl. No. 18/068,649, Inventors Bae et al., filed Dec. 19, 2022.
U.S. Appl. No. 18/381,141, inventors Bae C, et al., filed Oct. 17, 2023.
U.S. Appl. No. 18/381,149, inventors Bae C, et al., filed Oct. 17, 2023.
U.S. Appl. No. 18/493,772, inventors Bae C, et al., filed Oct. 24, 2023.
Adhikari S et al., "Ionomers for Electrochemical Energy Conversion & Storage Technologies," Polymer, 2020, 123080.
Ayers K, "Benchmarking Advanced Water Splitting Technologies: Best Practices in Materials Characterization," presented at the 2020 U.S. Department of Energy Hydrogen and Fuel Cells Program Annual Merit Review and Peer Evaluation Meeting on May 20, 2020, accessible at https://www.hydrogen.energy.gov/pdfs/review20/p170_ayers_2020_o.pdf (last accessed Dec. 15, 2020), 21 pp.
Ayers K, "Economic Production of Hydrogen through the Development of Novel, High Efficiency Electrocatalysts for Alkaline Membrane Electrolysis," presented at the 2017 U.S. Department of Energy (DOE) Hydrogen and Fuel Cells Program and Vehicle Technologies Office Annual Merit Review and Peer Evaluation Meeting on Jun. 5-9, 2017 in Washington, D.C., accessible at https://www.hydrogen.energy.gov/pdfs/review17/pd147_ayers_2017_o.pdf (last accessed Dec. 15, 2020), 29 pp.
Bae C, "Channeling Engineering of Hydroxide Ion Exchange Polymers and Reinforced Membranes," presented at the 2019 U.S. Department of Energy (DOE) Hydrogen and Fuel Cells Program Annual Merit Review and Peer Evaluation Meeting on April 29-May 1, 2019 in Crystal City, Virginia, accessible at https://www.hydrogen.energy.gov/pdfs/review19/arpae09_bae_2019_p.pdf (last accessed Dec. 15, 2020), 26 pp.
Bae C, "Cyclic Olefin Copolymer based Alkaline Exchange Polymers and Reinforced Membranes," presented at the 2019 U.S. Department of Energy (DOE) Hydrogen and Fuel Cells Program Annual Merit Review and Peer Evaluation Meeting on Apr. 29-May 1, 2019 in Crystal City, Virginia, accessible at https://www.hydrogen.energy.gov/pdfs/review19/fc307_bae_2019_p.pdf (last accessed Dec. 15, 2020), 13 pp.
Bae C, "Cyclic Olefin Copolymer based Alkaline Exchange Polymers and Reinforced Membranes," presented at the 2020 U.S. Department of Energy Hydrogen and Fuel Cells Program Annual Merit Review and Peer Evaluation Meeting on May 19, 2020, accessible at https://www.hydrogen.energy.gov/pdfs/review20/fc307_bae_2020_o.pdf (last accessed Dec. 15, 2020), 21 pp.
Bae C, "Development of Versatile Polymer Materials for Anion Exchange Membranes in Electrochemical Energy Conversion Technology," ECS Meeting Abstracts, 2020, MA2020-02, 2363 (1 p.).
Bae C et al., "Cyclic Olefin Copolymer-Based Alkaline Exchange Polymers and Reinforced Membranes" in 2019 Annual Progress Report: DOE Hydrogen and Fuel Cells Program, U.S. Department of Energy, Document No. DOE/GO-102020-5257, Apr. 2020, accessible at https://www.hydrogen.energy.gov/pdfs/progress19/fc_fc307_bae_2019.pdf (last accessed Dec. 15, 2020), 5 pp.
Bae C, "Ion Conducting Polymer Electrolyte Membranes for Energy Conversion Technology," presented at the Rensselaer Polytechnic Institute Center for Future Energy Systems (RPI CFES) Symposium on Apr. 10, 2019 in Troy, New York, accessible at https://cfes.rpi.edu/sites/default/files/A7%20Bae.pdf (last accessed Dec. 15, 2020), 19 pp.
Bae C, "New functional polymers for alternative energy applications," presented at University of Nevada, Las Vegas (UNLV) Renewable Energy Symposium on Aug. 20, 2008 in Las Vegas, Nevada, accessible at https://digitalscholarship.unlv.edu/cgi/viewcontent.cgi?article=1023&context=res (last accessed Jan. 16, 2021), 21 pp.
Black SB et al., "FTIR characterization of water-polymer interactions in superacid polymers," The Journal of Physical Chemistry B, 2013, 117 (50), 16266-16274.
Briem M et al., "Comparison of Novel 1, 1-Diphenylethylene Alternating Copolymer and Polystyrene Based Anion Exchange Membranes," ECS Meeting Abstracts, 2020, MA2020-2, 2242 with Presentation (31 pp.).
Brownell LV et al., "Synthesis of polar block grafted syndiotactic polystyrenes via a combination of iridium-catalyzed activation of aromatic C—H bonds and atom transfer radical polymerization," Journal of Polymer Science Part A: Polymer Chemistry, 2009, 47(23), 6655-6667.
CA Office Action dated Jul. 29, 2022, in Application No. CA2968110.
Cai, M et al., "Synthesis and Characterization of Poly(ether ketone ether ketone ketone)/Poly(ether ether ketone ketone) Copolymers Containing Naphthalene and Pendant Cyano Groups", Journal of Applied Polymer Science, 2009, vol. 112, pp. 3225-3231.
Chang, J. Y. et al., "Synthesis of a Linear Phenolic Polymer by an Aromatic Electrophilic Substitution Reaction", Macromolecules, 1997, vol. 30, pp. 8075-8077.
Chang Y et al., "Acidity Effect on Proton Conductivity of Hydrocarbon-Based Ionomers," ECS Transactions, 2010, 33 (1), 735.
Chang Y et al., "Aromatic ionomers with highly acidic sulfonate groups: acidity, hydration, and proton conductivity," Macromolecules, 2011, 44 (21), 8458-8469.
Chang Y et al., "Scope and regioselectivity of iridium-catalyzed C—H borylation of aromatic main-chain polymers," Macromolecules, 2013, 46 (5), 1754-1764.
Chang Y et al., "Direct Fluorination of the Carbonyl Group of Benzophenones Using Deoxo-Fluor®: Preparation of Bis (4-Fluorophenyl) Difluoromethane," Organic Syntheses, 2010, 87, 245-252.

(56) References Cited

OTHER PUBLICATIONS

Chang Y et al., "Direct nucleophilic fluorination of carbonyl groups of benzophenones and benzils with Deoxofluor," Tetrahedron, 2008, 64 (42), 9837-9842.
Chang Y et al., "Effect of superacidic side chain structures on high conductivity aromatic polymer fuel cell membranes," Macromolecules, 2015, 48(19), 7117-7126.
Chang Y et al., "Partially fluorinated sulfonated poly (ether amide) fuel cell membranes: influence of chemical structure on membrane properties," Polymers 3(1), 222-235.
Chang Y et al., "Poly (Arylene Ether Sulfone) Ionomers with Different Acidity Strengths and Fuel Cell Membrane Properties," ECS Transactions, 2013, 50(2), 1031.
Chang Y et al., "Polymer electrolyte membranes based on poly (arylene ether sulfone) with pendant perfluorosulfonic acid," Polymer Chemistry, 2013, 4(2), 272-281.
Chang Y et al., "Polymer-supported acid catalysis in organic synthesis," Current Organic Synthesis, 2011, 8 (2), 208-236.
Chang Y et al., "Polystyrene Ionomers Functionalized with Partially Fluorinated Short Side-Chain Sulfonic Acid for Fuel Cell Membrane Applications," in Sustainable Membrane Technology for Energy, Water, and Environment, Ismail AF & Matsuura T (eds.), John Wiley & Sons, 2012, pp. 243-249.
Chang Y et al., "Polystyrene-Based Superacidic Ionomers: Synthesis and Proton Exchange Membrane Applications," ECS Transactions, 2011, 41 (1), 1615.
Chang Y et al., "Polystyrene-based superacidic solid acid catalyst: synthesis and its application in biodiesel production," RSC advances, 2014, 4 (88), 47448-47454.
Chen, G. et al., "Cationic fluorinated polymer binders for microbial fuel cell cathodes", DOI: 10.1039/C2RA20705B (Paper) RSC Adv, 2012, vol. 2, pp. 5856-5862.
Chung HT et al., "Effect of organic cations on hydrogen oxidation reaction of carbon supported platinum," Journal of The Electrochemical Society, 2016, 163(14), F1503-F1509.
Clendinning, R. A, et al., "Poly(aryl Ether Ketone) Block and Chain-extended Copolymers. 1. Preparation and Characterization of a New Class of Functional Poly(aryl Ether Ketone) Oligomers", Macromolecules, 1993, vol. 26, 2361-2365.
CN Office Action dated Sep. 5, 2022 in Application No. CN202010532979.2 with English translation.
CN Office Action dated Sep. 1, 2022, in Application No. CN201980041740 with English translation.
CN Search Report issued on Oct. 29, 2019 in Application No. 201580062578.2.
CN Supplemental Search Report issued on Mar. 25, 2020 in Application No. 201580062578.2.
Colquhoun, H. M, et al., "Superelectrophiles in Aromatic Polymer Chemistry", Macromolecules, 2001, vol. 34, pp. 1122-1124.
Cruz, A.R. et al., "Precision Synthesis of Narrow Polydispersity, Ultrahigh Molecular Weight Linear Aromatic Polymers by $A_2+B_2$ Nonstoichiometric Step-Selective Polymerization", Macromolecules, 2012, vol. 45, pp. 6774-6780.
Dang, H-S., et al., "Poly(Phenylene Oxide) Functionalized With Quaternary Ammonium Groups via Flexible Alkyl Spacers for High-performance Anion Exchange Membranes," Journal of Materials Chemistry A, Jan. 1, 2015, vol. 3, No. 10, pp. 5280-5284, XP055564621.
Date B et al., "Synthesis and morphology study of SEBS triblock copolymers functionalized with sulfonate and phosphonate groups for proton exchange membrane fuel cells," Macromolecules, 2018, 51(3), 1020-1030.
Diaz, A. M. et al., "A Novel, One-Pot Synthesis of Novel 3F, 5F, and 8F Aromatic Polymers", Macromolecular Rapid Communication, 2007, vol. 28, pp. 183-187.
Einsla ML et al., "Toward improved conductivity of sulfonated aromatic proton exchange membranes at low relative humidity," Chemistry of Materials, 2008, 20, 5636-5642.
EP Partial Supplementary European Search Report dated Dec. 20, 2021, in application No. EP19791619.0.

EP Office Action issued on Mar. 12, 2020, in Application No. 15860054.4.
EP Search report dated Mar. 11, 2022, in Application No. EP19791619.0.
EP Supplemental Search Report and Written Opinion issued on Jun. 15, 2018, in Application No. 15860054.4.
Ex Parte Quayle Action issued on Mar. 5, 2019, in U.S. Appl. No. 15/527,967.
Extended European search report dated Jul. 22, 2022, in Application No. EP19889097.2.
Final Office Action issued on Jun. 3, 2021, in U.S. Appl. No. 16/471,358.
Florin, R. E., "Catalyst Specificity in Friedel-Crafts Copolymerization", Journal of the American Chemical Society, 1951, vol. 73, No. 9, pp. 4468-4470.
Fox, C. J, et al., "The Synthesis of Polymers via Acylation of Triphenylamine", Macromolecular Chemistry and Physics, Mar. 15, 1965, vol. 82, No. 1, 53-59.
Fritz, A. et al., "Synthesis of Aryleneisopropylidene Polymers", Journal of Polymer Science, 1972, vol. 10, pp. 2365-2378.
George, J. et al., "Inhibition of Friedel-Crafts Polymerization. I. The Mechanism of Inhibition", Journal of the American Chemical Society, 1950, vol. 72, No. 9, pp. 3891-3896.
George, J. et al., "Inhibition of Friedel-Crafts Polymerization. II. Factors Affecting Inhibitor Power", Journal of the American Chemical Society, 1950, vol. 72, No. 9, pp. 3896-3901.
Goseki, R et al., "Synthesis of a Well-defined Alternating Copolymer of 1,1-diphenylethylene and Tert-butyldimethyl-silyloxymethyl Substituted Styrene by Anionic Copolymerization: Toward Tailored Graft Copolymers With Controlled Side-chain Densities", Polymer Chemistry, 2019, vol. 10, pp. 6413-6422.
Gottesfeld S et al., "Anion exchange membrane fuel cells: Current status and remaining challenges," Journal of Power Sources, 2018, 375, 170-184.
Gottesfeld S et al., "Direct ammonia fuel cells (DAFCs) for transport application," presented at the 2019 U.S. Department of Energy (DOE) Hydrogen and Fuel Cells Program Annual Merit Review and Peer Evaluation Meeting on Apr. 29-May 1, 2019 in Crystal City, Virginia, accessible at https://www.hydrogen.energy.gov/pdfs/review19/arpae09_bae_2019_p.pdf (last accessed Dec. 15, 2020), 26 pp.
Guzman-Guiterrez, et al., "Dramatic Enhancement of Superacid-Catalyzed Polyhydroxyalkylation Reactions," Macromolecules, 2011, 44, pp. 194-202.
Guzman-Gutierrez, M. T. et al., "Structure-properties Relationship for the Gas Transport Properties of New Fluoro-containing Aromatic Polymers", Journal of Membrane Science, 2011, vol. 385-386, pp. 277-284.
Guzman-Gutierrez, M. T. et al., "Synthesis and Gas Transport Properties of New Aromatic 3F Polymers", Journal of Membrane Science, 2008, vol. 323, pp. 379-385.
Han KW et al., "Molecular dynamics simulation study of a polysulfone-based anion exchange membrane in comparison with the proton exchange membrane," The Journal of Physical Chemistry C, 2014, 118(24), 12577-12587.
Hao, J., et al., "Crosslinked High-performance Anion Exchange Membranes Based on Poly(Styrene-b-(Ethylene-co-butylene)-b-styrene)," Journal of Membrane Science, Jan. 24, 2018, vol. 551, pp. 66-75, XP055647135.
Haque, M.A. et al., "Acid Doped Polybenzimidazoles Based Membrane Electrode Assembly for High Temperature Proton Exchange Membrane Fuel Cell: A Review", International Journal of Hydrogen Energy, 2017, vol. 42, No. 14, pp. 9156-9179.
He, R. et al., "Proton Conductivity of Phosphoric Acid Doped Polybenzimidazole and Its Composites with Inorganic Proton Conductors", Journal of Membrane Science, Dec. 1, 2003, vol. 226, No. 1-2, pp. 169-184.
Henkensmeier D et al., "Overview: State-of-the Art Commercial Membranes for Anion Exchange Membrane Water Electrolysis," Journal of Electrochemical Energy Conversion and Storage, 2021, 18, 024001 (18 pp.).

(56) References Cited

OTHER PUBLICATIONS

Hernandez, M.G. et al., "Novel, Metal-Free, Superacid-Catalyzed "Click" Reactions of Isatins with Linear, Nonactivated, Multiring Aromatic Hydrocarbons", Macromolecules, 2010, vol. 43, pp. 6968-6979.

Hickner M et al., "Membrane Databases—New Schema and Dissemination (Supplement to: Development of Design Rules for High Hydroxide Transport in Polymer Architectures)," at the 2019 U.S. Department of Energy (DOE) Hydrogen and Fuel Cells Program Annual Merit Review and Peer Evaluation Meeting on Apr. 29-May 1, 2019 in Crystal City, Virginia, accessible at https://www.hydrogen.energy.gov/pdfs/review19/ia022_hickner_2019_p.pdf (last accessed Dec. 15, 2020), 14 pp.

Hu, H. et al. "Preparation and Characterization of Anion Exchange Membranes based on Fluorinated Poly(aryl ether oxadiazole)s for AEMFCs Applications", International Journal of Hydrogen Energy, 2012, pp. 61, https://kns.cnki.net/KCMS/detail/detail.aspxdbname=CMFD201401&filename=1013302180.nh.

Huang, B. et al., "Synthesis and Characterization of Poly(ether amide ether ketone)/Poly(ether ketone ketone) Copolymers", Journal of Applied Polymer Science, 2011, vol. 119, pp. 647-653.

Hwang T et al., "Ultrafiltration using graphene oxide surface-embedded polysulfone membranes," Separation and Purification Technology, 2016, 166, 41-47.

IN Office Action dated Mar. 23, 2022 in Application No. IN202037050645.

International Preliminary Report on Patentability and written opinion dated Aug. 4, 2022 in Application PCT/2021/US14759.

International Preliminary Report on Patentability issued on Jan. 7, 2020 in Application No. PCT/US2018/040898.

International Preliminary Report on Patentability issued on Jun. 25, 2019 in Application No. PCT/US2017/067482.

International Preliminary Report on Patentability issued on May 23, 2017, in Application No. PCT/US2015/061036.

International Preliminary Report on Patentability issued on Oct. 27, 2020, in Application No. PCT/US2019/028925.

International Search Report and Written Opinion issued Nov. 30, 2018 in Application No. PCT/US2018/040898.

International Search Report and Written Opinion issued on Feb. 4, 2016, in Application No. PCT/US2015/061036.

International Search Report and Written Opinion issued on Mar. 25, 2020, in Application No. PCT/US2019/063173.

International Search Report and Written Opinion issued on Mar. 6, 2018, in Application No. PCT/US2017/067482.

International Search Report and Written Opinion issued on May 27, 2021, in Application No. PCT/US2021/014759.

International Search Report and Written Opinion issued on Sep. 16, 2019, in Application No. PCT/US2019/028925.

International Search Report issued on Dec. 4, 2018 in Application No. PCT/US2018/040898.

Jeon JY et al., "Efficient Preparation of Styrene Block Copolymer Anion Exchange Membranes via One-Step Friedel-Crafts Bromoalkylation with Alkenes," Organic Process Research & Development, 2019, 23(8), 1580-1586.

Jeon JY et al., "Functionalization of Syndiotactic Polystyrene via Superacid-Catalyzed Friedel-Crafts Alkylation," Topics in Catalysis, 2018, 61(7-8), 610-615.

Jeon, J.Y., et al., "Ionic Functionalization of Polystyrene-b-poly(Ethylene-co-butylene)-b-polstyrene via Friedel-crafts Bromoalkylation and Its Application for Anion Exchange Membranes," ECS Transactions, Aug. 24, 2017, vol. 80, No. 8, pp. 967-970, XP055507090.

Jeon JY et al., "Synthesis of aromatic anion exchange membranes by Friedel-Crafts bromoalkylation and cross-linking of polystyrene block copolymers," Macromolecules, 2019, 52(5), 2139-2147.

Jeong, Y. et al., "Polymerization of a Photochromic Diarylethene by Friedel-Crafts Alkylation", Macromolecules, 2006, vol. 39, pp. 3106-3109.

Jia W et al., "Gas transport characteristics of fluorinated polystyrene-b-polybutadiene-b-polystyrene (F-SBS)," Journal of Membrane Science, 2019, 591, 117296 (24 pp.).

Jo TS et al., "Highly efficient incorporation of functional groups into aromatic main-chain polymer using iridium-catalyzed C—H activation and Suzuki—Miyaura reaction," Journal of the American Chemical Society 131, 2009,(5), 1656-1657.

Jo TS et al., "Synthesis of quaternary ammonium ion-grafted polyolefins via activation of inert C—H bonds and nitroxide mediated radical polymerization," Journal of Polymer Science Part A: Polymer Chemistry, 2009, 47(18), 4519-4531.

Jo TS et al., "Synthesis of sulfonated aromatic poly(ether amide) s and their application to proton exchange membrane fuel cells," Journal of Polymer Science Part A: Polymer Chemistry, 2009, 47(2), 485-496.

JP H06188005A: Online Translation of Abstract, Claims, and Detailed Description of retrieved from ESPACENET on Feb. 10, 2021 (20 pp.).

JP Notice of Refusal issued on Dec. 15, 2020 for Application No. 2020-008602.

JP Notice of Refusal issued on May 7, 2020 for Application No. 2017-526894.

JP Notice of Refusal issued on Oct. 23, 2019 for Application No. 2017-526894.

JP Search Report by Authorized Searching Authority issued Nov. 17, 2020 for Application No. 2020-008602.

JP Search Report by Authorized Searching Authority issued on Sep. 18, 2019 for Application No. 2017-526894.

Kazakova, et al., "Trifluoromethanesulfonic Acid in Organic Synthesis," Russian Journal of Organic Chemistry, 2017, vol. 53, No. 4, pp. 485-509.

Kim E et al., "Nanoscale building blocks for the development of novel proton exchange membrane fuel cells," The Journal of Physical Chemistry B, 2008, 112(11), 3283-3286.

Kim JH et al., "Fabrication of dense cerium pyrophosphate-polystyrene composite for application as low-temperature proton-conducting electrolytes," Journal of The Electrochemical Society, 2015, 162(10), F1159-F1164.

Kim S et al., "A Novel Sulfonated Aromatic Polymer Membrane with Different Pendant Groups for Vanadium Redox Flow Batteries (VRFBs)," 2018 AIChE Annual Meeting, 2018, 103g (3 pp.).

Kim S et al., "Novel Sulfonated Aromatic Polymer Membranes for Breaking the Coulombic and Voltage Efficiency Trade-Off Limitation in Vanadium Redox Flow Battery," 236th ECS Meeting (Oct. 13-17, 2019), ECS Meeting Abstracts, 2019, MA2019-02, 565 (2 pp.).

Kim YS, "Advanced Materials for Fully-Integrated MEAs in AEMFCs," presented at the 2018 U.S. Department of Energy (DOE) Hydrogen and Fuel Cells Program and Vehicle Technologies Office Annual Merit Review and Peer Evaluation Meeting on Jun. 13-15, 2018 in Washington, DC, accessible at https://www.hydrogen.energy.gov/pdfs/review18/fc146_kim_2018_o.pdf (last accessed Dec. 15, 2020), 25 pp.

Kim YS, "Scalable Elastomeric Membranes for Alkaline Water Electrolysis," presented at the 2019 U.S. Department of Energy (DOE) Hydrogen and Fuel Cells Program Annual Merit Review and Peer Evaluation Meeting on Apr. 29-May 1, 2019 in Crystal City, Virginia, accessible at https://www.hydrogen.energy.gov/pdfs/review19/p159_kim_2019_o.pdf (last accessed Dec. 15, 2020), 22 pp.

Kim YS, "Scalable Elastomeric Membranes for Alkaline Water Electrolysis," presented at the 2020 U.S. Department of Energy Hydrogen and Fuel Cells Program Annual Merit Review and Peer Evaluation Meeting on May 20, 2020, accessible at https://www.hydrogen.energy.gov/pdfs/review20/p159_kim_2020_p.pdf (last accessed Dec. 15, 2020), 29 pp.

Kim YS et al., "A New Class of Fuel Cells Based on Ion Pair-Coordinated Proton Exchange Membranes," 232nd ECS Meeting (Oct. 1-5, 2017), ECS Meeting Abstracts, 2017, MA2017-02, 1470 (2 pp.).

Kim YS et al., "Scalable Elastomeric Membranes for Alkaline Water Electrolysis," presented at the 2018 U.S. Department of Energy (DOE) Hydrogen and Fuel Cells Program Annual Merit Review and

(56) References Cited

OTHER PUBLICATIONS

Peer Evaluation Meeting on Jun. 13-15, 2018 in Washington, D.C., accessible at https://www.hydrogen.energy.gov/pdfs/review18/pd159_kim_2018_p.pdf (last accessed Dec. 15, 2020), 23 pp.

Kim YS et al., "HydroGEN Seedling: Scalable Elastomeric Membranes for Alkaline Water Electrolysis," in 2018 Annual Progress Report: DOE Hydrogen and Fuel Cells Program, U.S. Department of Energy, Document No. DOE/GO-102019-5156, Apr. 2019, accessible at https://www.hydrogen.energy.gov/pdfs/progress18/h2f_kim_2018.pdf (last accessed Dec. 15, 2020), 4 pp.

Kim YS, "Polymer-based fuel cells that operate from 80-220° C.," presented at the 2018 U.S. Department of Energy (DOE) Hydrogen and Fuel Cells Program and Vehicle Technologies Office Annual Merit Review and Peer Evaluation Meeting on Jun. 13-15, 2018 in Washington, DC, accessible at https://www.hydrogen.energy.gov/pdfs/review18/fc175_kim_2018_o.pdf (last accessed Dec. 15, 2020), 24 pp.

Kimura, K.W., et al., "Selective Electrochemical CO2 Reduction During Pulsed Potential Stems From Dynamic Interface," ACS Catalysis, ACS Paragon Plus Environment, University of Illinois at Urbana-Champaign, Downloaded from pubs.acs.org on Jun. 30, 2020, 31 pages.

Ko K et al., "Effect of Temperature on Nanophase-segregation and Transport in Polysulfone-Based Anion Exchange Membrane Fuel Cell: Molecular Dynamics Simulation Approach," Bulletin of the American Physical Society, 2013, 58(1), H1.307 (1 p.).

KR Office Action dated Feb. 28, 2022, in KR Application No. KR1020177016429 with English translation.

Kraglund MR et al., "Ion-solvating membranes as a new approach towards high rate alkaline electrolyzers," Energy & Environmental Science, Dec. 2019, 3313-3318.

Kraglund MR et al., Supplementary information for "Ion-solvating membranes as a new approach towards high rate alkaline electrolyzers," Energy & Environmental Science, Dec. 2019, 3313-3318 (19 pp.).

Kreuer KD, "On the development of proton conducting polymer membranes for hydrogen and methanol fuel cells," Journal of Membrane Science, 2001, 185, 29-39.

Le TP et al., "Miscibility and acid strength govern contact doping of organic photovoltaics with strong polyelectrolytes," Macromolecules, 2015, 48(15), 5162-5171.

Lee WH et al., "Fluorene-based hydroxide ion conducting polymers for chemically stable anion exchange membrane fuel cell," ACS Macro Letters, 2015, 4(4), 453-457.

Lee WH et al., "Molecular Engineering of Aromatic Polymer Electrolytes for Anion Exchange Membranes," ECS Transactions, 2017, 80(8), 941-944.

Lee WH et al., "Molecular Engineering of Ion-Conducting Polymers for Fuel Cell Membrane Applications," ECS Transactions, 2015, 69(17), 357-361.

Lee WH et al., "Poly (terphenylene) anion exchange membranes: the effect of backbone structure on morphology and membrane property," ACS Macro Letters, 2017, 6(5), 566-570.

Lee WH et al. "Robust Hydroxide Ion Conducting Poly(biphenyl)s for Alkaline Fuel Cell Membranes," ACS Macro Letters, 2015, 4(8), 814-818.

Lee WH et al., Supporting Information for "Robust Hydroxide Ion Conducting Poly(biphenyl)s for Alkaline Fuel Cell Membranes," ACS Macro Letters, 2015, 4(8), 814-818 (pp. 1-16).

Lee YB et al., "Effect of Ammonium Ion Structures on Properties of Alkaline Exchange Membrane Fuel Cells," ECS Transactions, 2010, 33(1), 1889-1892.

Lee YB et al., "Novel Synthetic Approach and their Properties for Alkaline Exchange Polysulfone Membranes," 2011 ECS Meeting Abstracts, MA2011-02, 866 (2 pp.).

Leng Y et al., "Solid-State Water Electrolysis with an Alkaline Membrane," Journal of the American Chemical Society, 2012, 134, 9054-9057.

Leng Y et al., Supporting Information for "Solid-State Water Electrolysis with an Alkaline Membrane," Journal of the American Chemical Society, 2012, 134, 9054-9057 (13 pp.).

Leonard DP et al., "Asymmetric electrode ionomer for low relative humidity operation of anion exchange membrane fuel cells," Journal of Materials Chemistry A, 2020, 8(28), 14135-14144.

Lim, H. et al., "Synthesis of Microporous Polymers by Friedel-crafts Reaction of 1-bromoadamantane with Aromatic Compounds and Their Surface Modification", Polymer Chemistry, 2012, vol. 3, pp. 868-870.

Liu, Z. et al., "$BF_3 \cdot Et_2O$-mediated Friedel-Crafts C—H bond polymerization to synthesize π-conjugation-interrupted polymer semiconductors", Polymer Chemistry, 2011, vol. 2, pp. 2179-2182.

Luo X et al., "Mesoscale Simulations of Quaternary Ammonium-Tethered Triblock Copolymers: Effects of the Degree of Functionalization and Styrene Content," Journal of Physical Chemistry C, 2020, 124(30), 16315-16323.

Maeyama, K. et al., "2,2'-Bis(4-benzoylphenoxy)biphenyl: A Novel Efficient Acyl-acceptant Monomer Yielding Wholly Aromatic Polyketones via Friedel-Crafts Type Polymerization with Arenedicarbonyl Chloride", Polymer Journal, 2004, vol. 36, No. 2, pp. 146-150.

Maeyama, K. et al., "Effective Synthesis of Wholly Aromatic Polyketones Using 2,2'-Diaryloxybiphenyl and Arenedicarboxylic Acid Derivatives via Friedel-crafts Type Acylation Polymerization", Reactive & Functional Polymers, 2004, vol. 61, pp. 71-79.

Mallakpour, S. E, et al., "Polymerization of N-methylpyrrole With Bis-triazolinediones via Electrophilic Aromatic Substitution", Journal of Polymer Science: Part A: Polymer Chemistry, Oct. 1987, vol. 25, 2781-2790.

Mallakpour, S. E, et al., "Uncatalyzed Polymerization of Bistriazolinediones with Electron-Rich Aromatic Compounds via Electrophilic Aromatic Substitution", Journal of Polymer Science: Part A: Polymer Chemistry, 1989, vol. 27, 217-235.

Matanovic I et al., "Adsorption of polyaromatic backbone impacts the performance of anion exchange membrane fuel cells," Chemistry of Materials, 2019, 31(11), 4195-4204.

Maurya S et al., "On the origin of permanent performance loss of anion exchange membrane fuel cells: Electrochemical oxidation of phenyl group," Journal of Power Sources, 2019, 436, 226866.

Maurya S et al., "Polyaromatic Ionomers for High Performance Alkaline Membrane Fuel Cells," ECS Meeting Abstracts, 2019, MA2019-02, 1572 (3 pp.).

Maurya S et al., "Rational design of polyaromatic ionomers for alkaline membrane fuel cells with 1 W cm-2 power density," Energy & Environmental Science, 2018, 11(11), 3283-3291.

Maurya S et al., "Surface adsorption affects the performance of alkaline anion-exchange membrane fuel cells," ACS Catalysis, 2018, 8(10), 9429-9439.

Meek KM et al., "High-Throughput Anion Exchange Membrane Characterization at NREL," ECS Transactions, 2019, 92(8), 723-731.

Mittelsteadt C et al., "Dimensionally Stable High Performance Membranes," presented at the 2016 U.S. Department of Energy (DOE) Hydrogen and Fuel Cells Program and Vehicle Technologies Office Annual Merit Review and Peer Evaluation Meeting on Jun. 6-10, 2019 in Washington, D.C., accessible at https://www.hydrogen.energy.gov/pdfs/review16/fc150_mittelsteadt_2016_p.pdf (last accessed Dec. 15, 2020), 19 pp.

Mochizuki T et al., "Simple, Effective Molecular Strategy for the Design of Fuel Cell Membranes: Combination of Perfluoroalkyl and Sulfonated Phenylene Groups," ACS Energy Letters, 2016, 1(2), 348-352 (Abstract and Supporting Information only, 11 pp.).

Mohanty AD et al., "Anion Exchange Fuel Cell Membranes Prepared from C—H Borylation and Suzuki Coupling Reactions," Macromolecules, 2014, 47, 1973-1980.

Mohanty AD et al., "Mechanistic analysis of ammonium cation stability for alkaline exchange membrane fuel cells," Journal of Materials Chemistry A, 2014, 2(41), 17314-17320.

Mohanty AD et al., "Stable Elastomeric Anion Exchange Membranes Based on Quaternary Ammonium-Tethered Polystyrene-b-poly(ethylene-co-butylene)-b-polystyrene Triblock Copolymers," Macromolecules, 2015, 48(19), 7085-7095.

(56) References Cited

OTHER PUBLICATIONS

Mohanty AD et al., "Thermochemical stability study of alkyl-tethered quaternary ammonium cations for anion exchange membrane fuel cells," Journal of the Electrochemical Society, 2017, 164(13), F1279-F1285.

Mohanty AD et al., "Transition Metal-Catalyzed Functionalization of Polyolefins Containing C—C, C=C, and C—H Bonds," Advances in Organometallic Chemistry, 2015, 64, 1-39.

Mohanty AD et al., "Systematic alkaline stability study of polymer backbones for anion exchange membrane applications," Macromolecules, 2016, 49(9), 3361-3372.

Mohanty AD et al., "Systematic Analysis of Cation Stability in Alkaline Exchange Membrane Fuel Cells," ECS Transactions, 2014, 64(3), 1221-1228.

Noh S et al., "Molecular engineering of hydroxide conducting polymers for anion exchange membranes in electrochemical energy conversion technology," Accounts of Chemical Research, 2019, 52(9), 2745-2755.

Norsten TB et al., "Highly fluorinated comb-shaped copolymers as proton exchange membranes (PEMs): improving PEM properties through rational design," Advanced Functional Materials, 2006, 16, 1814-1822.

Notice of Allowance dated Nov. 22, 2021 in U.S. Appl. No. 16/553,965.

Notice of Allowance issued on May 25, 2021, in U.S. Appl. No. 16/788,506.

Notice of Allowance issued on May 29, 2019, in U.S. Appl. No. 15/527,967.

Nystuen, N. J, et al., "Friedel-crafts Polymerization of Fluorene With Methylene Chloride, Methoxyacetyl Chloride, and Chloromethyl Methyl Ether", Journal of Polymer Science, 1985, vol. 23, 1433-1444.

Office Action issued on Feb. 25, 2021, in U.S. Appl. No. 16/471,358.
Office Action issued on Jan. 6, 2021, for U.S. Appl. No. 16/628,879.
Office Action issued on May 25, 2021, in U.S. Appl. No. 16/553,965.
Office Action issued on Sep. 10, 2020, in U.S. Appl. No. 16/471,358.

Olvera, L.I. et al., "Novel High Molecular Weight Aromatic Fluorinated Polymers from One-Pot, Metal-Free Step Polymerizations", Macromolecules 2013, vol. 46, pp. 7245-7256.

Pagels M et al., "Synthetic Approach to Hydrocarbon Proton Exchange Membranes Using Anion Exchange Membrane Precursors," ECS Meeting Abstracts, 2020, MA2020-02, 2237 with Presentation (19 pp.).

Pagels MK et al., "One-Pot Synthesis of Proton Exchange Membranes from Anion Exchange Membrane Precursors," ACS Macro Letters, 2020, 9(10), 1489-1493.

Pagels MK et al., Supporting Information for "One-Pot Synthesis of Proton Exchange Membranes from Anion Exchange Membrane Precursors," ACS Macro Letters, 2020, 9(10), 1489-1493 (14 pp.).

Pagels MK et al., "Synthesis of anion conducting polymer electrolyte membranes by Pd-Catalyzed Buchwald-Hartwig Amination coupling reaction," Tetrahedron, 2019, 75(31), 4150-4155.

Park EJ, "Chemically durable polymer electrolytes for solid-state alkaline water electrolysis," Journal of Power Sources, 2018, 375, 367-372.

Park EJ et al., "Dimethyl Substituted Polyaromatic Alkaline Ionomers for Better Alkaline Hydrogen Oxidation," ECS Meeting Abstracts, 2018, MA2018091, 1753 (3 pp.).

Park EJ et al., "How does a small structural change of anode ionomer make a big difference in alkaline membrane fuel cell performance?," Journal of Materials Chemistry A, 2019, 7(43), 25040-25046.

Park EJ et al., "Superacidic porous polymer catalyst and its application in esterification of carboxylic acid," Structural Chemistry, 2017, 28(2), 493-500.

Park EJ et al., "Versatile functionalization of aromatic polysulfones via thiol-ene click chemistry," Journal of Polymer Science Part A: Polymer Chemistry, 2016, 54(19), 3237-3243.

Park IS et al., "Sulfonated Polyamide Based IPMCs," Proceedings of SPIE, Electroactive Polymer Actuators and Devices (EAPAD) 2009, 7287, 72870X.

Park J et al., "A comparison study of ionic polymer-metal composites (IPMCs) fabricated with Nafion and other ion exchange membranes," Proceedings of SPIE, Electroactive Polymer Actuators and Devices (EAPAD) 2013, 8687, 868714.

Park J et al., "Electromechanical performance and other characteristics of IPMCs fabricated with various commercially available ion exchange membranes," Smart materials and structures, 2014, 23(7), 074001.

Parrondo J et al., "Synthesis and Alkaline Stability of Solubilized Anion Exchange Membrane Binders Based on Poly(phenylene oxide) Functionalized with Quaternary Ammonium Groups via a Hexyl Spacer," Journal of The Electrochemical Society, 2015, 162, F1236-F1242.

Parshad, R., "Determination of Transverse Wave Velocities in Solids", Nature, Nov. 30, 1946, vol. 158, pp. 789-790.

Pena, E.R., et al., "Factors Enhancing the Reactivity of Carbonyl Compounds for Polycondensations with Aromatic Hydrocarbons. A Computational Study," Macromlecules, 2004, 37(16), 6227-6235.

Perret R et al., "IV.F.4 Hydrogen Fuel Cells and Storage Technology Project," in 2008 Annual Progress Report: DOE Hydrogen Program, U.S. Department of Energy, accessible at https://www.hydrogen.energy.gov/pdfs/progress08/iv_f_4_perret.pdf (last accessed Dec. 15, 2020), pp. 776-786.

Perret R et al., "IV.G.1 Hydrogen Fuel Cells and Storage Technology Project (FCAST)," in 2007 Annual Progress Report: DOE Hydrogen Program, U.S. Department of Energy, accessible at https://www.hydrogen.energy.gov/pdfs/progress07/iv_g_1_perret.pdf (last accessed Dec. 15, 2020), pp. 638-647.

Perret R et al., "IV.G.4 Fundamental Research for Optimization of Hydrogen Storage and Utilization," in 2006 Annual Progress Report: DOE Hydrogen Program, U.S. Department of Energy, accessible at https://www.hydrogen.energy.gov/pdfs/progress06/iv_g_4_perret.pdf (last accessed Dec. 15, 2020), pp. 575-581.

Perret R et al., "IV.H.5 Hydrogen Fuel Cells and Storage Technology Project," in 2009 Annual Progress Report: DOE Hydrogen Program, U.S. Department of Energy, accessible at https://www.hydrogen.energy.gov/pdfs/progress09/iv_h_5_perret.pdf (last accessed Dec. 15, 2020), pp. 801-807.

Powers W et al., "Borylation of Polystyrene: Random Blocky vs. Truly Random Copolymers," Bulletin of the American Physical Society, 2009, 54(1), C1.089 (1 p.).

Sepehr, F., et al., "Mesoscale Simulations of Anion Exchange Membranes Based on Quaternary Ammonium Tethered Triblock Copolymers," Macromolecules, Jun. 5, 2017, vol. 50, pp. 4397-4405, XP055564626.

Shin D et al., "Ch. 8: Anion Exchange Membranes: Stability and Synthetic Approach," in The Chemistry of Membranes Used in Fuel Cells: Degradation and Stabilization, S. Schlick (eds.), Wiley, 2018, pp. 195-228.

Shin J et al., "A new homogeneous polymer support based on syndiotactic polystyrene and its application in palladium-catalyzed Suzuki-Miyaura cross-coupling reactions," Green Chemistry, 2009, 11(10), 1576-1580.

Shin J et al., "Borylation of Polystyrene," Synfacts 2008 (2), 145.

Shin J et al., "Controlled Functionalization of Crystalline Polystyrenes via Activation of Aromatic C—H Bonds," Macromolecules, 2007, 40(24), 8600-8608.

Shin J et al., "Hydrophilic functionalization of syndiotactic polystyrene via a combination of electrophilic bromination and Suzuki-Miyaura reaction," Journal of Polymer Science Part A: Polymer Chemistry, 2010, 48(19), 4335-4343.

Shin J et al., "Hydrophilic graft modification of a commercial crystalline polyolefin," Journal of Polymer Science Part A: Polymer Chemistry, 2008, 46(11), 3533-3545.

Sivakami JN et al., "'Kick-started' oxetanes in photoinitiated cationic polymerization: scale-up synthesis and structure-property studies," Proceedings of RadTech International UV & EB Technology Expo & Conference (held on May 15-18, 2016 in Chicago, IL), 2016, 5 pp.

(56) References Cited

OTHER PUBLICATIONS

Smedley SB et al., "Measuring water hydrogen bonding distributions in proton exchange membranes using linear Fourier Transform Infrared spectroscopy," Solid State Ionics, 2015, 275, 66-70.
Smedley SB et al., "Spectroscopic Characterization of Sulfonate Charge Density in Ion-Containing Polymers," The Journal of Physical Chemistry B, 2017, 121(51), 11504-11510.
Tian D et al., "Phosphoric Acid-Doped Biphenyl-Backbone Ion-Pair Coordinated Pems with Broad Relative Humidity Tolerance," ECS Meeting Abstracts, 2020, MA2020-02, 2240 (2 pp.).
Tian D et al., "Phosphoric Acid-Doped Ion-Pair Coordinated PEMs with Broad Relative Humidity Tolerance," Energies, 2020, 13(8), 1924 (14 pp.).
Tian D et al., "Structure and gas transport characteristics of triethylene oxide-grafted polystyrene-b-poly(ethylene-co-butylene)-b-polystyrene," Journal of Polymer Science 2020, 58(18), 2654-2663.
Tipper, C. F. H., et al., "Some Reactions of Cyclopropane and a Comparison With the Lower Olefins. Part IV. Friedel-crafts Polymerisation", Journal of the Chemical Society, 1959, pp. 1325-1359.
Trant C et al., "Impact of Microstructured Morphology on Macroscale Properties of Semi-Crystalline Triblock Copolymer Anion Exchange Membranes," ECS Meeting Abstracts, 2020, MA2020-01, 2267 (2 pp.).
Trant C et al., "Synthesis and Characterization of Anion-Exchange Membranes Using Semicrystalline Triblock Copolymers in Ordered and Disordered States," Macromolecules 2020, 53(19), 8548-8561.
U.S. Corrected Notice of Allowability dated Dec. 27, 2021, in U.S. Appl. No. 16/553,965.
U.S Corrected Notice of Allowability Dec. 15, 2021 in U.S. Appl. No. 16/788,506.
US Final Office Action mailed Sep. 3, 2021, in U.S. Appl. No. 16/553,965.
U.S. Non-Final Office Action dated Mar. 18, 2022, in U.S. Appl. No. 16/471,358.
U.S. Non-Final Office Action dated Oct. 14, 2021 in U.S. Appl. No. 16/842,037.
U.S. Non-Final office Action dated Sep. 29, 2022 in U.S. Appl. No. 17/658,627.
US Notice of Allowance dated on Sep. 8, 2021, in U.S. Appl. No. 16/788,506.
US Notice of Allowance dated on Sep. 15, 2021, in U.S. Appl. No. 16/788,506.
U.S. Notice of Allowance dated Sep. 28, 2022 in U.S. Appl. No. 16/471,358.
U.S. Appl. No. 17/758,767, inventors Bae et al., filed Jul. 13, 2022.
U.S. Restriction Requirement dated Jan. 6, 2022, in U.S. Appl. No. 16/471,358.
Velasco, V.M. et al., "Novel Aromatic Polymers with Pentafluorophenyl Pendant Groups", Macromolecules, 2008, vol. 41, pp. 8504-8512.
Walgama R et al., "The Effect of Backbone Structure on Functional Properties in Anion Exchange Membranes; Comparison of Poly (fluorene) with Poly (biphenylene) and Poly (terphenylene)s," ECS Meeting Abstracts, 2020, MA2020-02, 2268 (3 pp.).
Wang, J. et al., "Poly(aryl piperidinium) membranes and ionomers for hydroxide exchange membrane fuel cells", Nature Energy, 2019, vol. 4, pp. 392-398.
Wang J et al., Supplementary Information for "Poly(aryl piperidinium) membranes and ionomers for hydroxide exchange membrane fuel cells," Nature Energy, Apr. 2019, 392-398 (13 pp.).
Wang T et al., "Poly (terphenylene) anion exchange membranes with high conductivity and low vanadium permeability for vanadium redox flow batteries (VRFBs)," Journal of Membrane Science, 2020, 598, 117665.
Wang T et al., Supplementary Information for "Suppressing vanadium crossover using sulfonated aromatic ion exchange membranes for high performance flow batteries," Materials Advances, 2020, 1(7), 2206-2218 (15 pp.).
Wang T et al., "Suppressing vanadium crossover using sulfonated aromatic ion exchange membranes for high performance flow batteries," Materials Advances, 2020, 1(7), 2206-2218.

Weck PF et al., "Nanoscale building blocks for the development of novel proton-exchange membranes fuel cells: A first-principles study," Bulletin of the American Physical Society, 2008, 53(2), C1.095 (1 p.).
Wi SN et al., "Study of Water Dynamics in Superacidic Hydrocarbon Proton Exchange Membranes Using Solid-State and Pulsed-Field Gradient NMR Spectroscopy," National High Magnetic Field Laboratory 2015 Annual Research Report, 2015 (1 p.).
Xu H, "Novel Fluorinated Ionomer for PEM Fuel Cells," presented at the 2018 U.S. Department of Energy (DOE) Hydrogen and Fuel Cells Program and Vehicle Technologies Office Annual Merit Review and Peer Evaluation Meeting on Jun. 13-15, 2018 in Washington, DC, accessible at https://www.hydrogen.energy.gov/pdfs/review18/fc185_xu_2018_p.pdf (last accessed Dec. 15, 2020), 15 pp.
Xu, Y., et al., "Self-Cleaning CO2 Reduction Systems: Unsteady Electrochemical Forcing Enables Stability," ACS Energy Letters, Jun. 2021, pp. 809-815.
Yang ZT et al., "Photoinitiated cationic polymerization of sustainable epoxy and oxetane thermosets," Proceedings of RadTech International UV & EB Technology Expo & Conference (held on May 15-18, 2016 in Chicago, IL), 2016, 5 pp.
Yim W et al., "Development of Ultrafiltration Membrane-Separation Technology for Energy-Efficient Water Treatment and Desalination Process," Final Report for DOE Award No. DE-SC0005062, 2016, 18 pp.
Yin Z et al., "An alkaline polymer electrolyte CO2 electrolyzer operated with pure water," Energy & Environmental Science, Dec. 2019, 2455-2462.
Yin Z et al., Supporting Information for "An alkaline polymer electrolyte CO2 electrolyzer operated with pure water," Energy & Environmental Science, Dec. 2019, 2455-2462 (7 pp.).
Yokota et al., "Anion Conductive Aromatic Block Copolymers Continuing Diphenyl Ether or Sulfide Groups for Application to Alkaline Fuel Cells," vol. 6, No. 19, Oct. 8, 2014, pp. 17044-17052.
Yonezawa, N. et al., "Electrophilic Aromatic Acylation Synthesis of Wholly Aromatic Polyketones Composed of 2,2'-Dimethoxybiphenylene Units", 2003, Polymer Journal, vol. 35, No. 12, pp. 998-1002.
Yonezawa, N, et al., "Synthesis of Wholly Aromatic Polyketones", Polymer Journal, 2009, vol. 41, No. 11, pp. 899-928.
Yoshimura K et al., "Aromatic Polymer with Pendant Perfluoroalkyl Sulfonic Acid for Fuel Cell Applications," Macromolecules, 2009, 42(23), 9302-9306 (Abstract and Supporting Information only, 8 pp.).
Zelovich T et al., "Ab initio molecular dynamics study of hydroxide diffusion mechanisms in nanoconfined structural mimics of anion exchange membranes," The Journal of Physical Chemistry C, 2019, 123(8), 4638-4653.
Zelovich T et al., "Anion Exchange Membranes with Low Hydration Conditions from an Ab Initio Molecular Dynamics Perspective," ECS Meeting Abstracts, 2019, MA2019-01, 1957 (2 pp.).
Zelovich T et al., "Hydroxide ion diffusion in anion-exchange membranes at low hydration: insights from ab initio molecular dynamics," Chemistry of Materials, 2019 31(15), 5778-5787.
Zeng QH et al., "Anion exchange membranes based on quaternized polystyrene-block-poly (ethylene-ran-butylene)-block-polystyrene for direct methanol alkaline fuel cells," Journal of Membrane Science, 2010, 349(1-2), 237-243.
Zhu L et al., "Effects of tertiary amines and quaternary ammonium halides in polysulfone on membrane gas separation properties," Journal of Polymer Science Part B: Polymer Physics, 2018, 56(18), 1239-1250.
AU Examination Report dated Aug. 28, 2024, in AU Application No. 2019388889.
CN Office Action dated Jul. 18, 2024 in CN Application No. 201980041740 with English translation.
KR Office Action dated Aug. 9, 2024 in KR Application No. 10-2021-7019702 with English Translation.
U.S. Non-Final Office Action dated Aug. 2, 2024 in U.S. Appl. No. 18/493,772.
U.S. Non-Final Office Action dated May 22, 2024 in U.S. Appl. No. 18/381,149.
U.S. Notice of Allowance dated Apr. 3, 2024 in U.S. Appl. No. 17/569,564.

(56) References Cited

OTHER PUBLICATIONS

EP Office Action dated Apr. 30, 2025 in EP Application No. 19791619.0.
BR Office Action dated Aug. 12, 2024 in BR Application No. 112022014554-3 with English Translation.
CA Office Action dated Nov. 4, 2024 in CA Application No. 3120957.
JP Office Action dated Oct. 8, 2024 in JP Application No. 2022-542716 with English translation.
KR Office Action dated Sep. 30, 2024 in KR Application No. 10-2020-7033775 with English Translation.
U.S. Final Office Action dated Nov. 14, 2024 in U.S. Appl. No. 18/381,149.

\* cited by examiner

| Concentration of diamine crosslinker | IEC (meq/g) Titration | OH⁻ Water Uptake (wt %) |
|---|---|---|
| 0 | 1.41 (± 0.05) | 155 (± 10) |
| 10% | 1.41 (± 0.05) | 70 (± 3) |
| 30% | 1.42 (± 0.04) | 46 (± 1) |
| 50% | 1.42 (± 0.04) | 28 (± 1) |

FIG. 3

CROSSLINKING OF AROMATIC POLYMERS FOR ANION EXCHANGE MEMBRANES

CROSS REFERENCE TO RELATED APPLICATION(S)

This application is a National Phase Application under 35 U.S.C. § 371 of PCT Application No. PCT/US2019/028925, titled "CROSSLINKING OF AROMATIC POLYMERS FOR ANION EXCHANGE MEMBRANES," filed Apr. 24, 2019, which claims the benefit of U.S. Provisional Application No. 62/661,705, filed Apr. 24, 2018, each of which is incorporated by reference as if disclosed herein in its entirety.

STATEMENT REGARDING FEDERALLY SPONSORED RESEARCH OR DEVELOPMENT

This invention was made with government support under grant no. DE-AR0000769 awarded by the Department of Energy. The government has certain rights in the invention.

BACKGROUND

Alkaline exchange membranes (AEMs), also called anion exchange membranes, allow transportation of anions, e.g., $OH^-$, $Cl^-$, $Br^-$, etc., from a cathode to an anode in electrochemical reaction. AEMs are a component of AEM fuel cells where hydrogen and oxygen are used to generate electricity and water by-product. AEMs are also used in water electrolysis where water splits into hydrogen and oxygen with the help electricity, the cleanest and the most desirable process of hydrogen production. In AEM fuel cells and water electrolysis, hydroxide ions (OH—) are transported through the membrane with help of water molecules. Other areas of AEMs use include battery, sensors, and actuators (plastic membranes swing reversibly as a result of migration of ions).

Over the last several years, several research groups have developed new AEM materials. However, these materials disadvantageously tend to degrade easily under high alkaline. Currently, most anion AEMs are prepared from polymers containing quaternary ammonium group along the side chains. Unfortunately, these ionic side groups interact with water strongly, which acts as a plasticizer and causes softening of the polymer and swelling upon hydration.

SUMMARY

Some embodiments of the present disclosure are directed to an ion exchange membrane material composed of a crosslinked polymer network including a first poly(styrene-b-ethylene-r-butylene-b-styrene) triblock copolymer (SEBS), wherein at least one phenyl group of the first SEBS is functionalized with a first alkyl group, and the carbon at the benzylic position of the first alkyl group is saturated with at least two additional alkyl groups, a second poly(styrene-b-ethylene-r-butylene-b-styrene) triblock copolymer (SEBS), wherein at least one phenyl group of the second SEBS is functionalized with a second alkyl group, and the carbon at the benzylic position of the second alkyl group is saturated with at least two additional alkyl groups, and a diamine linker bound to the first alkyl group and the second alkyl group. In some embodiments, at least one phenyl group of the first SEBS is functionalized with an uncrosslinked alkyl group, the carbon at the benzylic position of the uncrosslinked alkyl group is saturated with at least two additional alkyl groups, the uncrosslinked alkyl group including a quaternary ammonium group. In some embodiments, at least one phenyl group of the second SEBS is functionalized with an uncrosslinked alkyl group, the carbon at the benzylic position of the uncrosslinked alkyl group is saturated with at least two additional alkyl groups, the uncrosslinked alkyl group including a quaternary ammonium group. In some embodiments, the concentration of diamine linker in the crosslinked polymer network is greater than about 5 mol %. In some embodiments, the concentration of diamine linker in the crosslinked polymer network is greater than about 30 mol %. In some embodiments, the concentration of diamine linker in the crosslinked polymer network is about 50 mol %. In some embodiments, the diamine linker is N,N,N',N'-tetramethyl-1,6-hexanediamine.

Some embodiments of the present disclosure are directed to a method of making an ion exchange membrane including functionalizing an aromatic block copolymer with one or more alkyl halide groups, the carbon at the benzylic position of the one or more alkyl halide groups being saturated with at least two additional alkyl groups, mixing the functionalized aromatic block copolymer with a diamine to replace one or more halide groups with a quaternary ammonium group, and crosslinking the functionalized aromatic block copolymer with another functionalized aromatic block copolymer via the diamine to create a crosslinked polymer. In some embodiments, the linker is a diamine linker, a polyol, a polyaromatic compound, alkene dimer, dithiol, or combinations thereof. In some embodiments, the diamine has two tertiary amine groups. In some embodiments, the method includes adding trialkyl amine to the crosslinked polymer to convert unreacted alkyl halide groups to quaternary ammonium groups. In some embodiments, the aromatic block copolymer is a biphenyl polymer.

BRIEF DESCRIPTION OF THE DRAWINGS

The drawings show embodiments of the disclosed subject matter for the purpose of illustrating the invention. However, it should be understood that the present application is not limited to the precise arrangements and instrumentalities shown in the drawings, wherein:

FIG. 3 is a table showing decreases in water uptake with increases in crosslinker in ion exchange materials according to some embodiments of the present disclosure;

DETAILED DESCRIPTION

Figure 1:
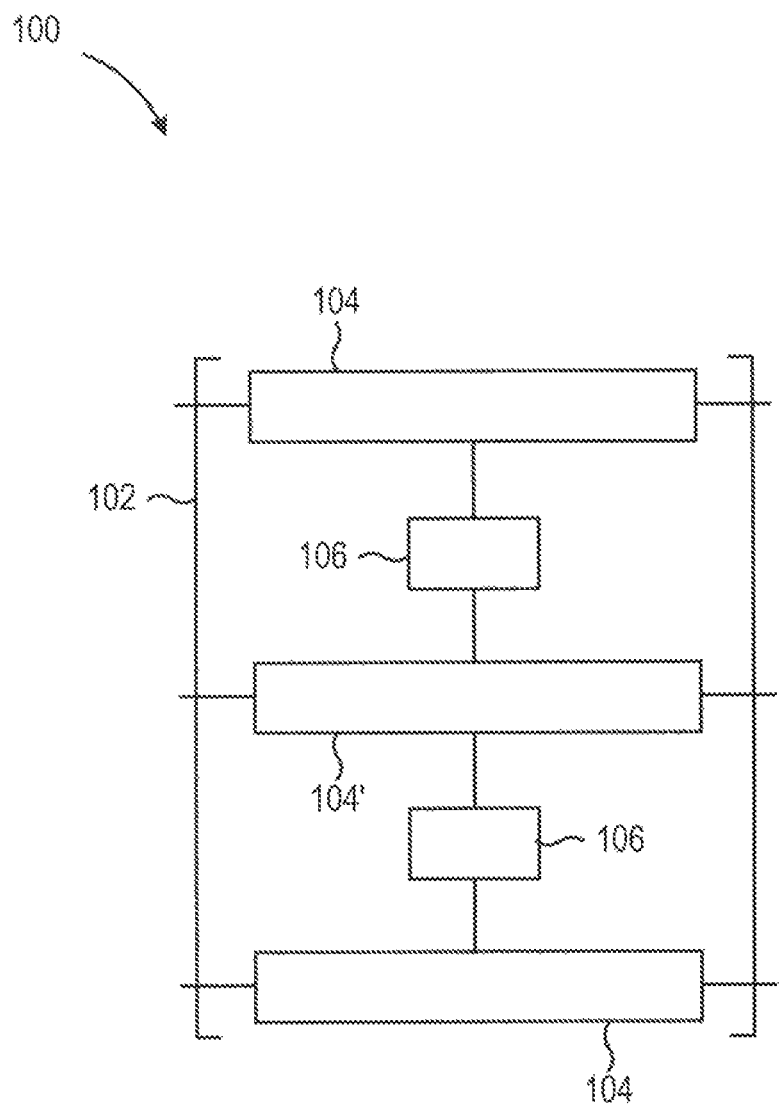
FIG. 1 is a schematic drawing of an ion exchange material for use in making an ion exchange membrane according to some embodiments of the present disclosure.

Referring now to FIG. 1, some aspects of the disclosed subject matter include an ion exchange material 100. In some embodiments, the ion exchange material is suitable as an ion exchange membrane for use in, e.g., fuel cells, water hydrolysis systems, electrochemical hydrogen compressors, batteries, sensors, actuators, etc. In some embodiments, the ion exchange membrane is an anion exchange membrane.

In some embodiments, ion exchange material 100 includes a crosslinked polymer network 102. In some embodiments, crosslinked network 102 includes one or more polymeric chains 104 and one or more linkers 106 linking the one or more polymeric chains 104. In some embodiments, polymeric chains 104 are polyaromatic polymers, copolymers, block copolymers, or combinations thereof. In some embodiments, polymeric chains 104 are functionalized with one or more functional groups.

In some embodiments, one or more of polymeric chains 104 is poly(styrene-b-ethylene-r-butylene-b-styrene) triblock copolymer (SEBS). In some embodiments, at least one phenyl group of polymeric chains 104, e.g., SEBS, is functionalized with at least one alkyl group. In some embodiments, the carbon at the benzylic position of the at least one alkyl group is saturated with at least two additional carbons, alkyl groups, etc. In some embodiments, the at least one alkyl group is an alkyl halide group prior to crosslinking to another polymeric chain 104 via one or more linkers 106, as will be discussed in greater detail below. In some embodiments, linkers 106 crosslink polymeric chains 104 via binding between the alkyl functional groups on the polymeric chains. In some embodiments, linker 106 is a diamine. In some embodiments, the diamine includes at least two tertiary amine groups with an alkyl group disposed therebetween. In some embodiments, the linker is N,N,N',N'-tetramethyl-1,6-hexanediamine. In some embodiments, at least one phenyl group of crosslinked network 102 is functionalized with an uncrosslinked alkyl group, the carbon at the benzylic position of the uncrosslinked alkyl group is saturated with at least two additional alkyl groups, the uncrosslinked alkyl group including a quaternary ammonium group.

In some embodiments, the concentration of linker in the crosslinked polymer network is greater than about 5 mol % of alkyl functional group. In some embodiments, the concentration of linker in the crosslinked polymer network is greater than about 30 mol % of alkyl functional group. In some embodiments, the concentration of linker in the crosslinked polymer network is about 50 mol % of alkyl functional group. In some embodiments, the concentration of linker in the crosslinked polymer network is greater than about 50 mol % of alkyl functional group.

By way of example, and still referring to FIG. 1, crosslinked polymer network 102 includes a first SEBS chain 104, wherein at least one phenyl group of the first SEBS is functionalized with a first alkyl group, and the carbon at the benzylic position of the first alkyl group is saturated with at least two additional alkyl groups. The first SEBS chain 104 is crosslinked with a second SEBS chain 104', wherein at least one phenyl group of the second SEBS is functionalized with a second alkyl group, and the carbon at the benzylic position of the second alkyl group is saturated with at least two additional alkyl groups. A diamine linker 106 is bound to the first alkyl group and the second alkyl group, resulting in the structure according to formula I:

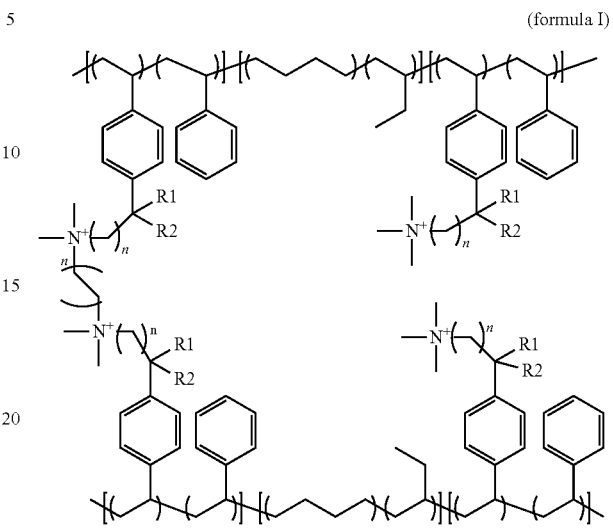

(formula I)

wherein R1 includes H or $CH_3$ and R2 includes $CH_3$.

Figure 2:
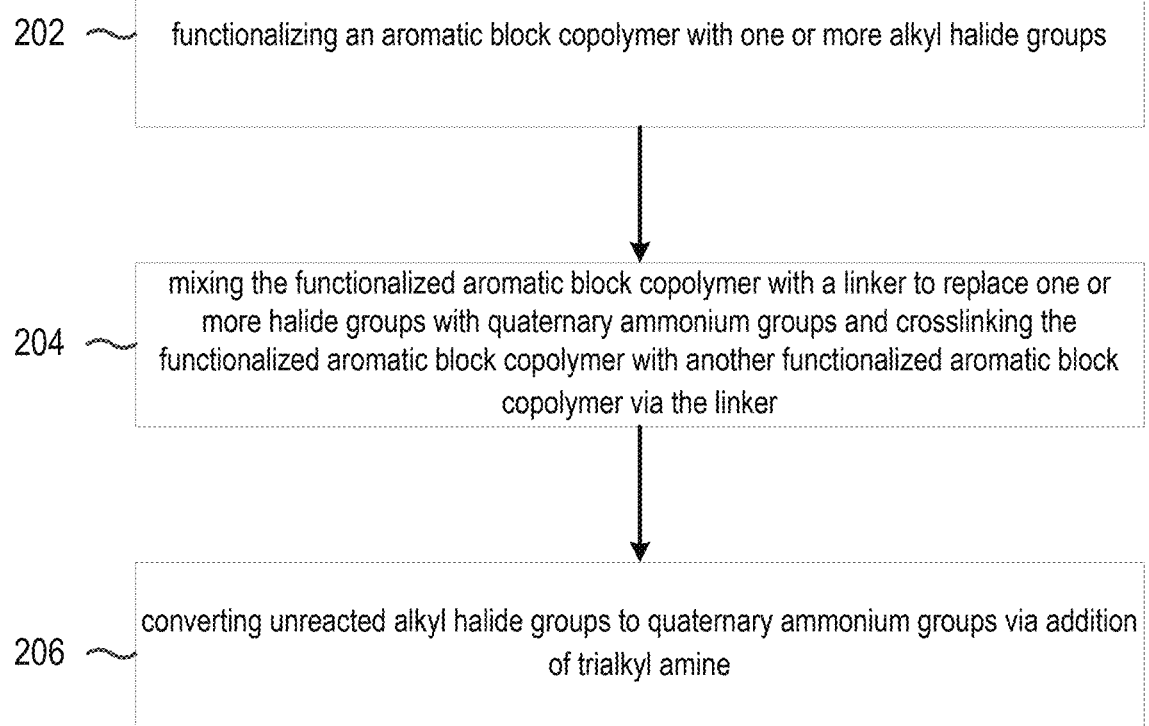
FIG. 2 is a chart of a method for making an ion exchange membrane according to some embodiments of the present disclosure.

Referring now to FIG. 2, some embodiments of the present disclosure are directed a method, e.g., a reaction pathway, for making an ion exchange membrane. At 202, an aromatic block copolymer, e.g., SEBS, is functionalized with one or more alkyl halide groups. In some embodiments, the carbon at the benzylic position of the one or more alkyl halide groups is saturated with at least two additional alkyl groups. At 204, the functionalized aromatic block copolymer is mixed with a linker to replace one or more halide groups with quaternary ammonium groups and crosslinking the functionalized aromatic block copolymer with another functionalized aromatic block copolymer via the linker to create a crosslinked polymer network. At 206, unreacted alkyl halide groups are converted to quaternary ammonium groups via addition of trialkyl amine. Referring to FIG. 3, the higher the concentration (mol %) of linker, the lower the water uptake of the network and thus the membrane.

Referring again to FIG. 1, in some embodiments, one or more polymeric chains 104 is a biphenyl block polymer. In some embodiments, the biphenyl block polymer is functionalized with one or more alkyl groups. In some embodiments, linkers 106 crosslink the biphenyl block polymer via binding between the alkyl functional groups on the chains. In some embodiments, the linker is a diamine linker, a polyol, a polyaromatic compound, alkene dimer, dithiol, or combinations thereof, as will be discussed in greater detail below. In some embodiments, the concentration of linker in the crosslinked biphenyl block polymer network is greater than about 5 mol % of alkyl functional group. In some embodiments, the concentration of linker in the crosslinked biphenyl block polymer network is greater than about 30 mol % of alkyl functional group. In some embodiments, the concentration of linker in the biphenyl block crosslinked polymer network is about 50 mol % of alkyl functional group. In some embodiments, the concentration of linker in the biphenyl block crosslinked polymer network is greater than about 50 mol % of alkyl functional group. In some embodiments, at least one alkyl functional group is uncrosslinked and includes a quaternary ammonium group.

Figure 4:
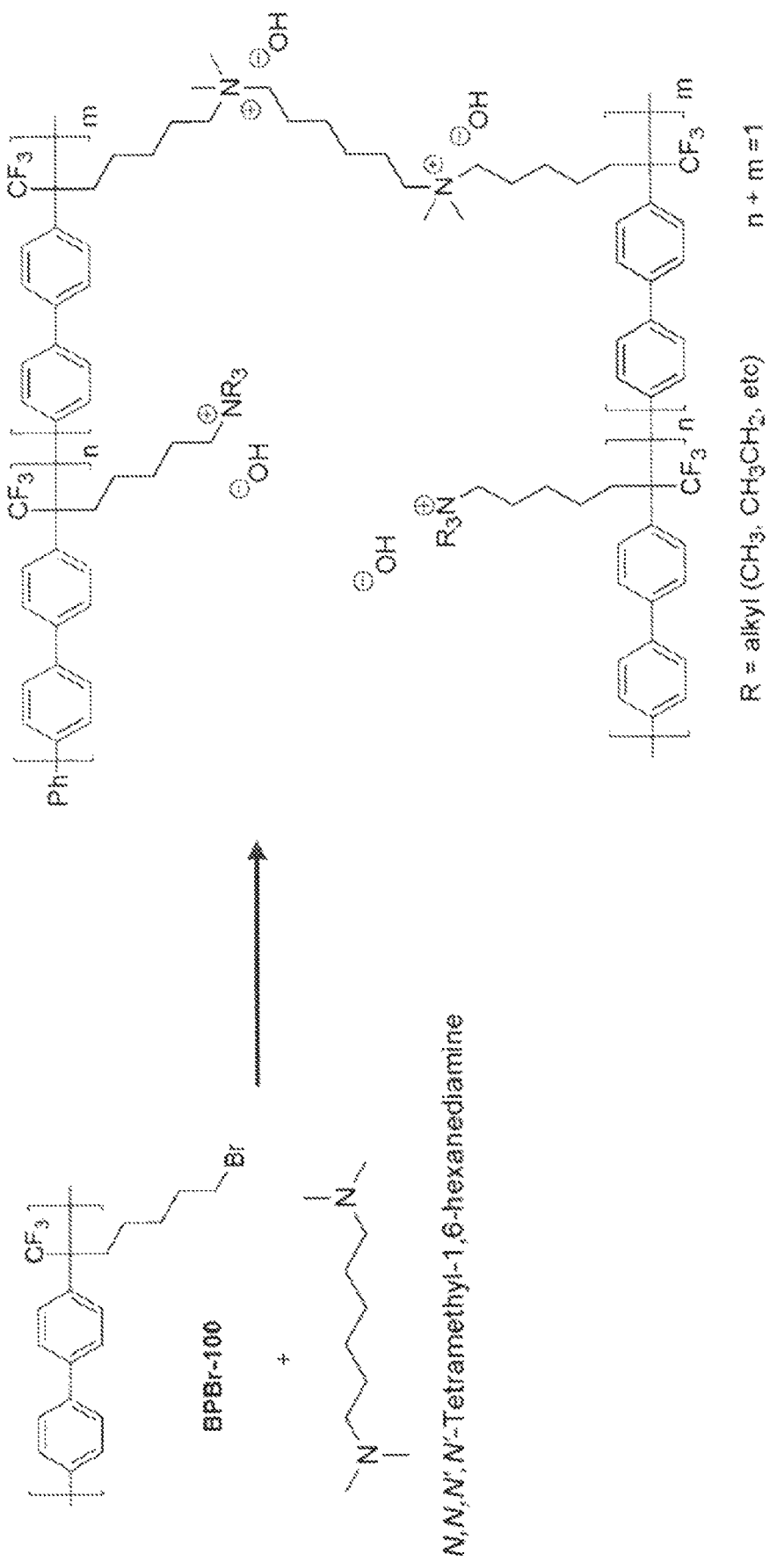
FIG. 4 is a chart of a method for making an ion exchange membrane according to some embodiments of the present disclosure.

Referring now to FIG. 4, in some embodiments, one or more biphenyl block polymers is functionalized with alkyl halide groups. In some embodiments, the one or more biphenyl block polymers are mixed, e.g., cast, with a linker, e.g., a diamine, undergoing a substantially simultaneous quaternization and crosslinking reaction and crosslinking to other biphenyl block polymers. In some embodiments, unreacted alkyl halide groups are converted to quaternary ammonium groups via addition of trialkyl amine.

Figure 5:
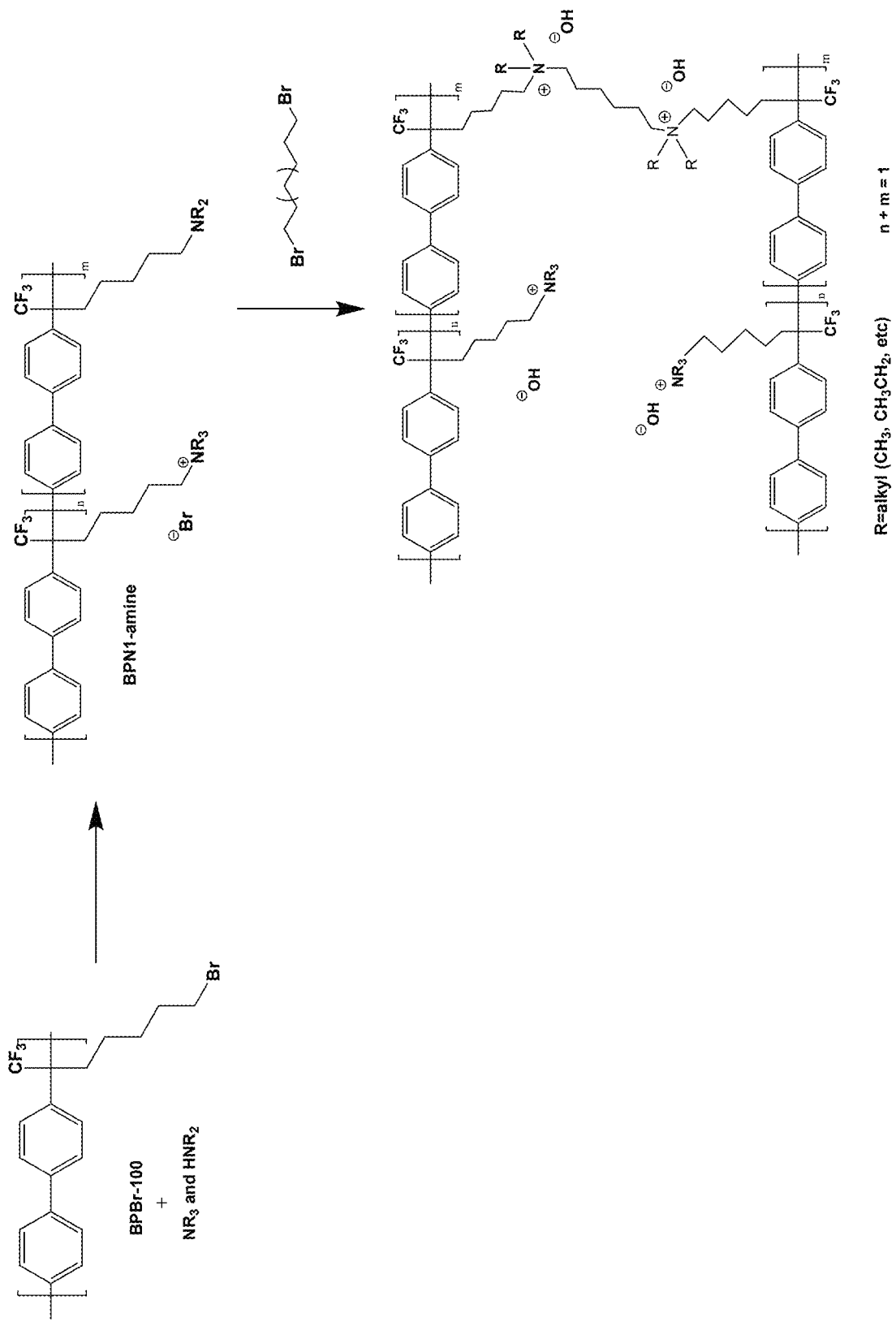
FIG. 5 is a chart of a method for making an ion exchange membrane according to some embodiments of the present disclosure.

Referring now to FIG. 5, in some embodiments, one or more biphenyl block polymers is functionalized with alkyl halide groups. In some embodiments, a mixture of trialkyl amines and dialkyl amines is added to the biphenyl block polymers to convert the halogen in the alkyl halide groups to a mixture of quaternary ammonium and tertiary amine groups. In some embodiments, the one or more biphenyl block polymers are mixed, e.g., cast, with a linker, e.g., a diamine, undergoing a substantially simultaneous quaternization and crosslinking reaction at the tertiary amine groups.

Figure 6:
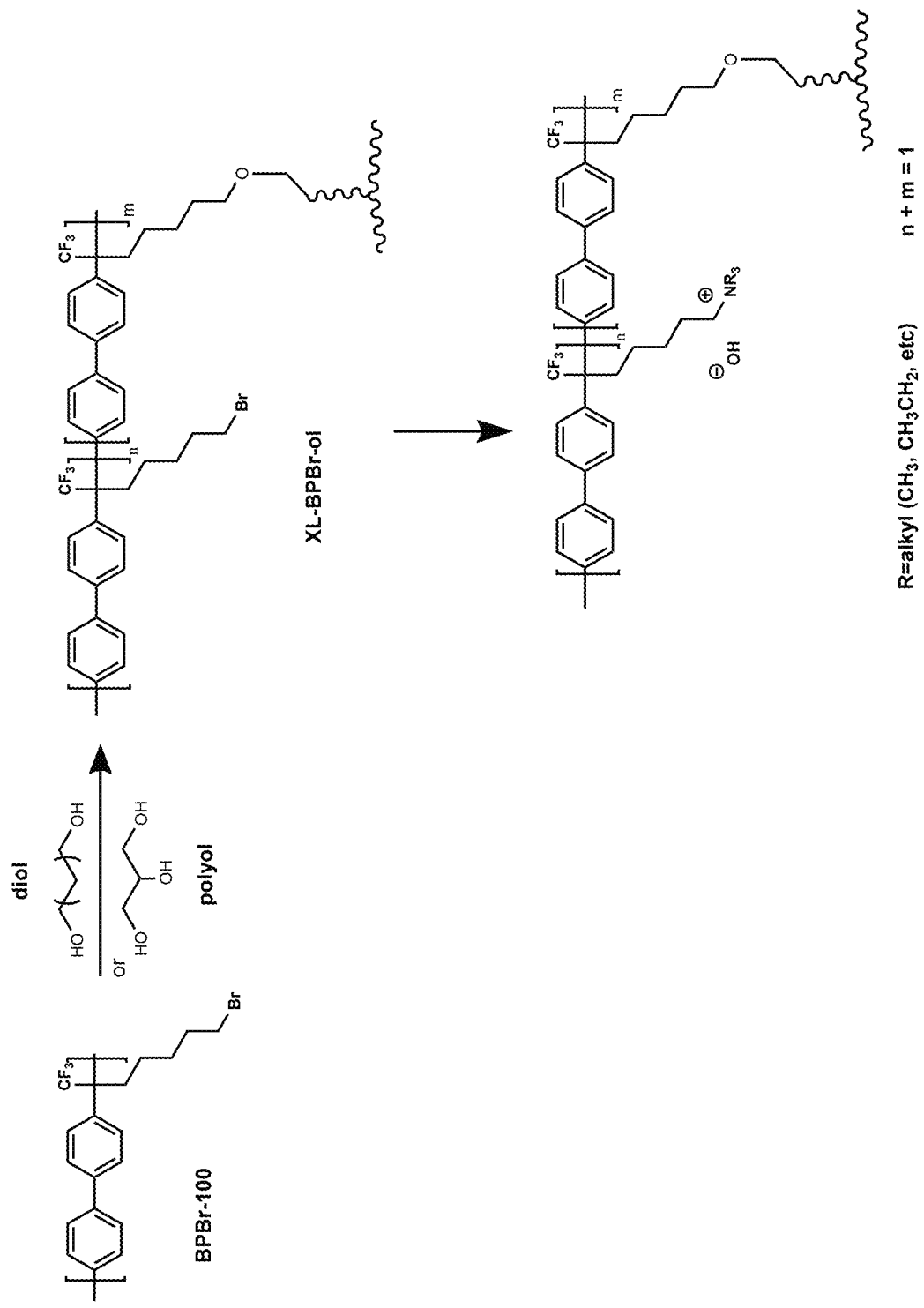
FIG. 6 is a chart of a method for making an ion exchange membrane according to some embodiments of the present disclosure.

Referring now to FIG. 6, in some embodiments, one or more biphenyl block polymers is functionalized with alkyl halide groups. In some embodiments, the one or more biphenyl block polymers are mixed, e.g., cast, with a polyol such as a diol or a triol, undergoing an etherification reaction and crosslinking to other biphenyl block polymers. In some embodiments, unreacted alkyl halide groups are converted to quaternary ammonium groups via addition of trialkyl amine.

Figure 7:
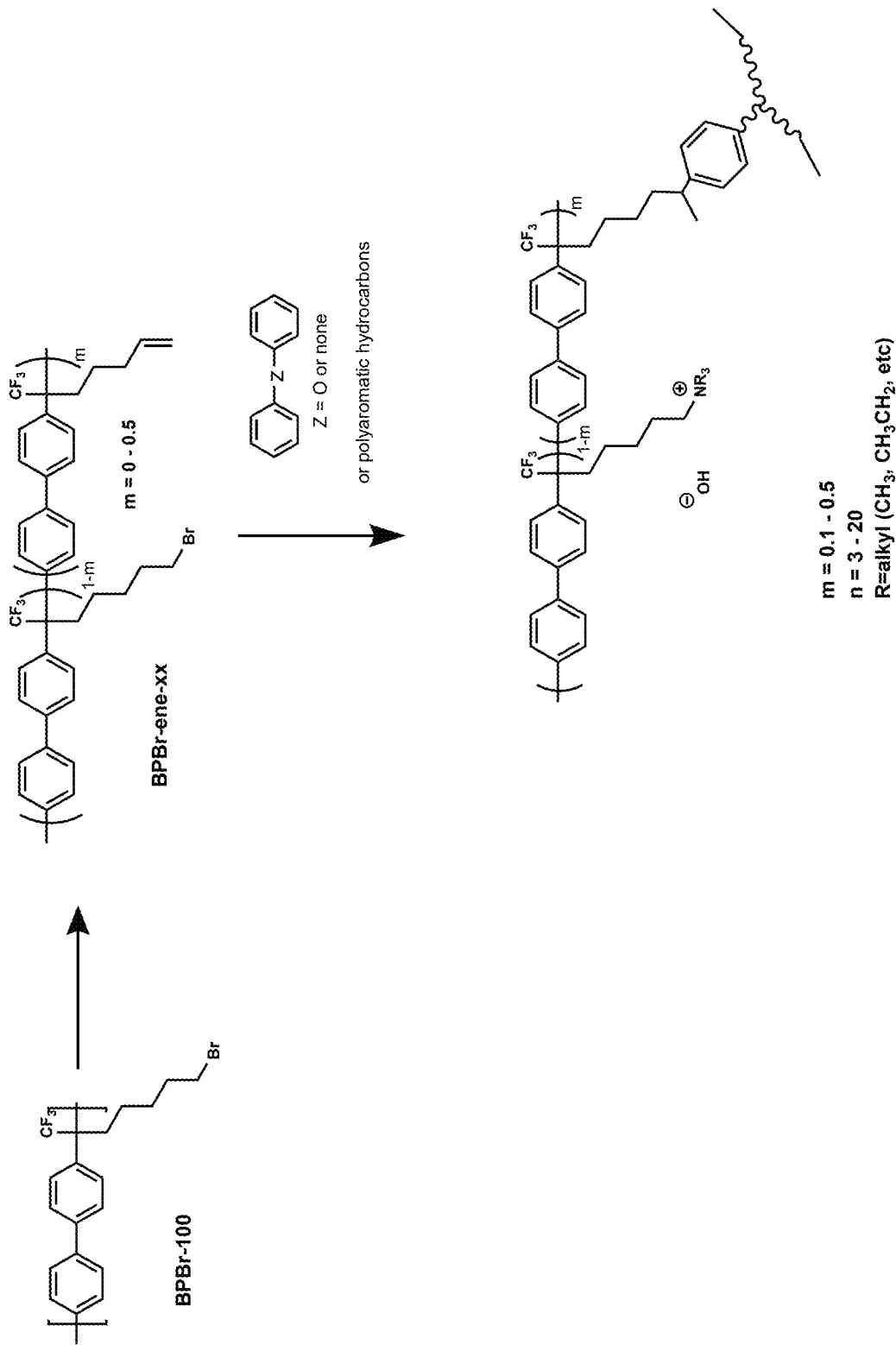
FIG. 7 is a chart of a method for making an ion exchange membrane according to some embodiments of the present disclosure.

Referring now to FIG. 7, in some embodiments, one or more biphenyl block polymers is functionalized with alkyl halide groups. In some embodiments, the one or more biphenyl block polymers are reacted with a base to convert at least some halogens to a vinyl group. In some embodiments, the vinyl group undergoes a crosslinking reaction via acid-catalyzed Fridel-Crafts alkylation with a polyaromatic compound such that an aromatic ring serves as a linker between the polymers in a crosslinked polymer network. In some embodiments, the polyaromatic compound includes a biphenyl compound, a diphenyl ether compound, a triptycene compound, a fluorene or fluorene derivative compound, etc., or combinations thereof. In some embodiments, unreacted alkyl halide groups are converted to quaternary ammonium groups via addition of trialkyl amine.

Figure 8:
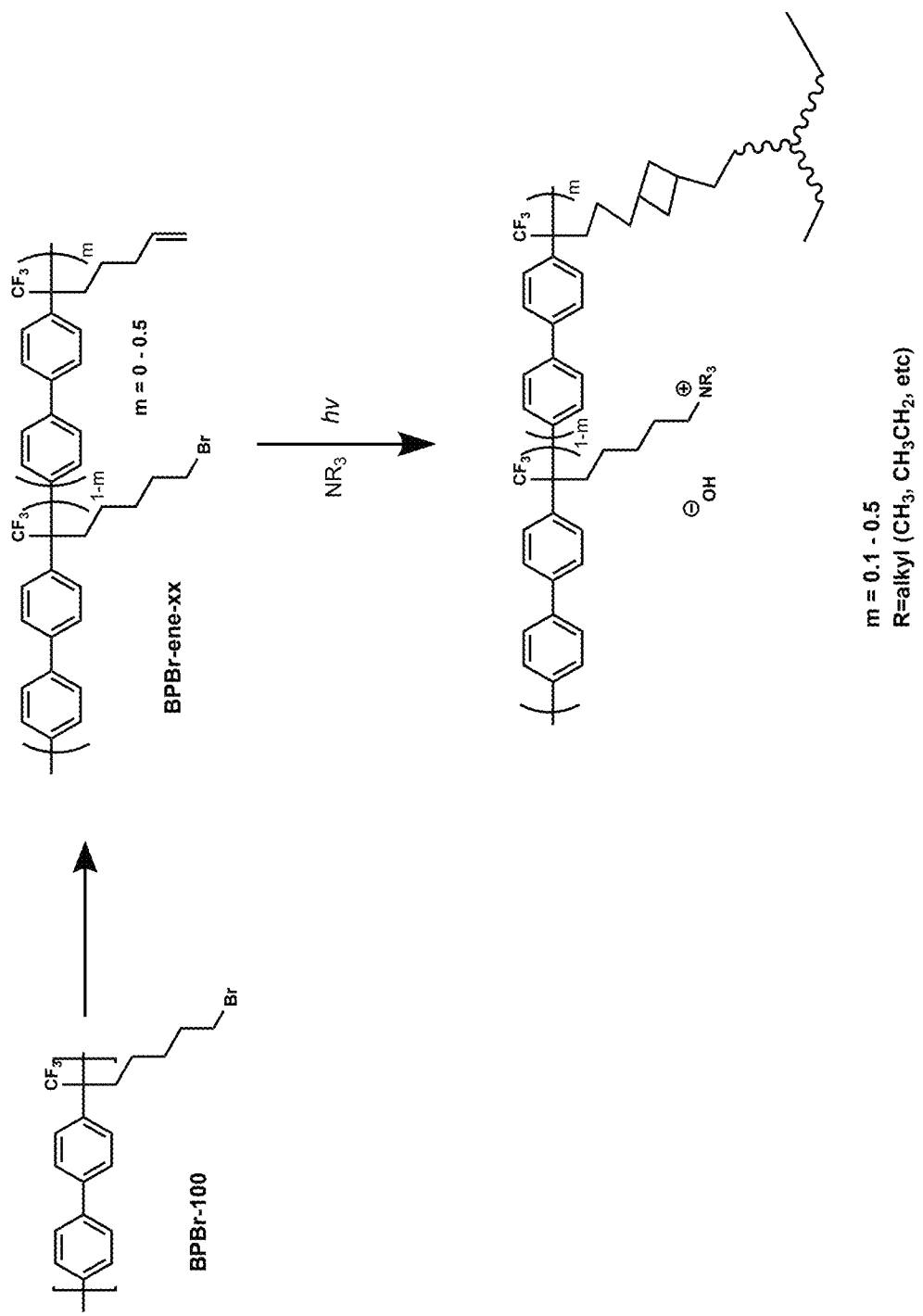
FIG. 8 is a chart of a method for making an ion exchange membrane according to some embodiments of the present disclosure.

Referring now to FIG. 8, in some embodiments, one or more biphenyl block polymers is functionalized with alkyl halide groups. In some embodiments, the one or more biphenyl block polymers are reacted with a base to convert at least some halogens to a vinyl group. In some embodiments, the one or more biphenyl block polymers are then UV-irradiated, causing dimerization between the vinyl groups as a cyclobutane ring, which serves as a linker between the polymers in a crosslinked polymer network. In some embodiments, unreacted alkyl halide groups are converted to quaternary ammonium groups via addition of trialkyl amine.

Figure 9:
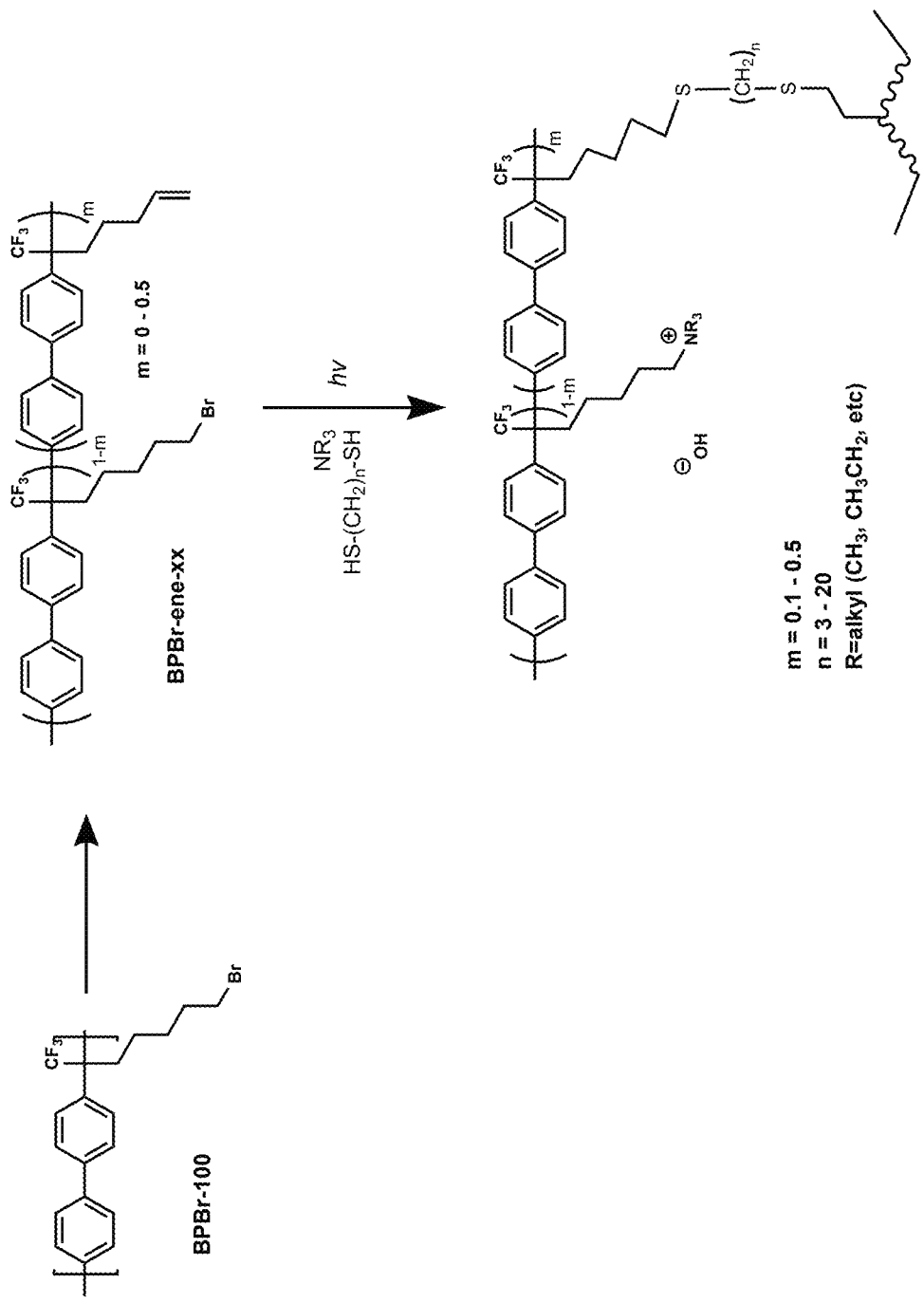
FIG. 9 is a chart of a method for making an ion exchange membrane according to some embodiments of the present disclosure.

Referring now to FIG. 9, in some embodiments, one or more biphenyl block polymers is functionalized with alkyl halide groups. In some embodiments, the one or more biphenyl block polymers are reacted with a base to convert at least some halogens to a vinyl group. In some embodiments, the vinyl group undergoes a crosslinking reaction via UV-irradiation and addition of a dithiol. The resulting thiol-ene reaction crosslinks the polymers in the crosslinked polymer network where the dithiol serves as the linker. In some embodiments, the dithiol is an alkyl dithiol, e.g., $SH-(CH_2)_n-SH$. In some embodiments, unreacted alkyl halide groups are converted to quaternary ammonium groups via addition of trialkyl amine.

Methods of the present disclosure are advantageous as a versatile approach to preparing ion exchange membranes and ionomer binders from any styrene copolymers functionalized with alkyl halide groups. The reaction conditions are straightforward and the reactions themselves can be carried out in a relatively low amount of steps, as quaternization and crosslinking occur substantially simultaneously. Further, simply increasing concentration of crosslinker in the reactions described herein produced membranes with reduced water uptake, leading to an expectation of enhanced stability under hydrated conditions and greater durability. Advantageously, this reduction in water uptake came with little change to ion exchange capacity. The crosslinked polymer networks consistent with the embodiments of the present disclosure are useful for applications such as batteries, anion exchange membrane fuel cells, anion exchange membrane electrolysis, ionomer for fuel cells and electrolysis, membrane and ionomer for other electrochemical energy conversion devices, water purification, gas separation (particularly $CO_2$ from coal-fired power plants), etc.

Although the disclosed subject matter has been described and illustrated with respect to embodiments thereof, it should be understood by those skilled in the art that features of the disclosed embodiments can be combined, rearranged, etc., to produce additional embodiments within the scope of the invention, and that various other changes, omissions, and additions may be made therein and thereto, without parting from the spirit and scope of the present invention.

What is claimed is:

1. An ion exchange membrane material comprising:
a crosslinked polymer network including:
   a first polymeric chain, wherein the first polymeric chain comprises:
      a first poly(styrene-b-ethylene-r-butylene-b-styrene) triblock copolymer (SEBS), wherein at least one phenyl group of the first SEBS is functionalized with a first alkyl group, and the carbon at the benzylic position of the first alkyl group is saturated with at least two additional alkyl groups;
   a second polymeric chain, wherein the second polymeric chain comprises:
      a second poly(styrene-b-ethylene-r-butylene-b-styrene) triblock copolymer (SEBS), wherein at least one phenyl group of the second SEBS is functionalized with a second alkyl group, and the carbon at the benzylic position of the second alkyl group is saturated with at least two additional alkyl groups; and
   a diamine linker bound to the first alkyl group and the second alkyl group,
   wherein the first polymeric chain, the second polymeric chain, and/or the crosslinked polymer network comprises a polyaromatic polymer, a copolymer, a block copolymer, or a combination thereof.

2. The material according to claim 1, wherein at least one phenyl group of the first polymeric chain or the second polymeric chain is functionalized with an uncrosslinked alkyl group and the uncrosslinked alkyl group including a quaternary ammonium group.

3. The material according to claim 1, wherein the concentration of diamine linker in the crosslinked polymer network is greater than 5 mol %.

4. The material according to claim 1, wherein the diamine linker is N,N,N',N'-tetramethyl-1,6-hexanediamine.

5. An ion exchange membrane material comprising:
a crosslinked polymer network including:
   a first polymeric chain, wherein the first polymeric chain comprises an aromatic main-chain polymer functionalized with a first alkyl group;
   a second polymeric chain, wherein the second polymeric chain comprises an aromatic main-chain polymer functionalized with a second alkyl group; and
   a diamine linker bound to the first alkyl group and the second alkyl group, wherein the crosslinked polymer network comprises the structure according to formula II:

(formula II)

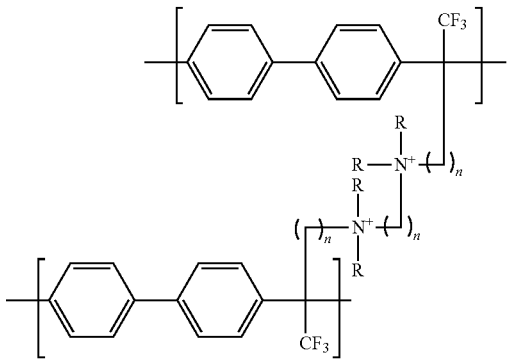

wherein R includes alkyl and n is 1 or more.

6. The ion exchange membrane material according to claim 5, wherein the concentration of diamine linker in the crosslinked polymer network is greater than 5 mol %.

7. The ion exchange membrane material according to claim 5, wherein the diamine linker is N,N,N',N'-tetramethyl-1,6-hexanediamine.

8. An ion exchange membrane material comprising:
a crosslinked polymer network including:
   a first polymeric chain comprising a first aromatic main-chain block copolymer functionalized with a first alkyl group;
   a second polymeric chain comprising a second aromatic main-chain block copolymer functionalized with a second alkyl group; and
   a diamine linker bound to the first alkyl group and the second alkyl group,
   wherein the first aromatic main-chain block copolymer and the second aromatic main-chain block copolymer is a biphenyl block polymer.

9. The material according to claim 8, wherein the first aromatic main-chain polymer in the first polymeric chain further comprises —C(CF$_3$)(R)—, in which R is the first alkyl group; and/or wherein the second aromatic main-chain polymer in the second polymeric chain further comprises—C(CF$_3$)(R)—, in which R is the second alkyl group.

10. The material according to claim 8, wherein the first aromatic main-chain polymer and the second aromatic main-chain polymer are functionalized with an alkyl halide group.

11. The material according to claim 8, wherein the concentration of diamine linker in the crosslinked polymer network is greater than 5 mol %.

12. The material according to claim 8, wherein the diamine linker is N,N,N',N'-tetramethyl-1,6-hexanediamine.

* * * * *